(12) United States Patent
Lai et al.

(10) Patent No.: US 7,741,965 B2
(45) Date of Patent: Jun. 22, 2010

(54) RADIO FREQUENCY IDENTIFICATION (RFID) SYSTEM

(75) Inventors: Kin Yue Albert Lai, Hong Kong (CN); On Yung Timmy Wong, Hong Kong (CN); Tak Ki Peter Wan, Hong Kong (CN); Hon Fai Eric Wong, Hong Kong (CN); Ngai Ming Tsang, Hong Kong (CN); Pak Yip Tony Ma, Hong Kong (CN); Ping Man Jeff Ko, Hong Kong (CN); Chi Chiu David Cheung, Hong Kong (CN)

(73) Assignee: Chung Nam Electronics Co., Ltd., Hong Kong (HK)

( * ) Notice: Subject to any disclaimer, the term of this patent is extended or adjusted under 35 U.S.C. 154(b) by 1126 days.

(21) Appl. No.: 11/156,326

(22) Filed: Jun. 16, 2005

(65) Prior Publication Data

US 2006/0261938 A1 Nov. 23, 2006

Related U.S. Application Data

(60) Provisional application No. 60/683,464, filed on May 19, 2005.

(51) Int. Cl.
*G08B 26/00* (2006.01)

(52) U.S. Cl. .................... 340/505; 340/572.1

(58) Field of Classification Search ............... 340/505, 340/572.1, 573.1, 5.8, 10.41, 870.2; 348/211.2, 348/207.99
See application file for complete search history.

(56) References Cited

U.S. PATENT DOCUMENTS

| 4,075,632 A | 2/1978 | Baldwin et al. |
| 4,739,328 A | 4/1988 | Koelle et al. |
| 5,030,807 A | 7/1991 | Landt et al. |
| 5,694,514 A | 12/1997 | Evans et al. |
| 5,777,561 A | 7/1998 | Chieu et al. |
| 5,828,693 A | 10/1998 | Mays et al. |

(Continued)

FOREIGN PATENT DOCUMENTS

EP 0810540 12/1997

(Continued)

*Primary Examiner*—Anh V La
(74) *Attorney, Agent, or Firm*—Smith-Hill & Bedell, P.C.

(57) ABSTRACT

A group of technologies related to RFID reader and tag are described, including: redundant networked multimedia RFID reader, auto-ranging RFID reader, auto-planning RFID reader, smart active antenna RFID reader and novel RFID tags. These enabling technologies bring RFID reader operations into a new level of automation, capability and ease of implementation.

21 Claims, 20 Drawing Sheets

U.S. PATENT DOCUMENTS

| | | | |
|---|---|---|---|
| 5,850,181 A | 12/1998 | Heinrich et al. | |
| 5,862,117 A | 1/1999 | Fuentes et al. | |
| 5,912,632 A | 6/1999 | Dieska et al. | |
| 5,995,019 A | 11/1999 | Chieu et al. | |
| 6,078,251 A * | 6/2000 | Landt et al. | 340/10.41 |
| 6,154,136 A | 11/2000 | Van Eeden | |
| 6,288,629 B1 | 9/2001 | Cofino et al. | |
| 6,381,418 B1 | 4/2002 | Spurr et al. | |
| 6,400,274 B1 | 6/2002 | Duan et al. | |
| 6,429,775 B1 | 8/2002 | Martinez et al. | |
| 7,127,261 B2 * | 10/2006 | Van Erlach | 455/456.5 |
| 7,274,909 B2 * | 9/2007 | Perttila et al. | 455/41.2 |
| 7,349,532 B2 * | 3/2008 | Henderson | 379/142.04 |
| 2003/0010825 A1 | 1/2003 | Schmidt et al. | |
| 2003/0043042 A1 * | 3/2003 | Moores et al. | 340/573.1 |
| 2005/0219375 A1 * | 10/2005 | Hasegawa et al. | 348/211.2 |

FOREIGN PATENT DOCUMENTS

| | | |
|---|---|---|
| EP | 0849734 | 6/1998 |
| FR | 2790346 | 9/2000 |
| WO | 9938162 | 7/1999 |

* cited by examiner

RADIO FREQUENCY IDENTIFICATION (RFID) SYSTEM

CROSS-REFERENCE TO RELATED APPLICATION

This application claims benefit under 35 USC 119(e) of U.S. Provisional Application No. 60/683,464 filed May 19, 2005.

BACKGROUND OF THE INVENTION

Radio Frequency Identification (RFID) is a technology similar to barcode for unique identification of an item, yet using wireless technology so that there is no need to optically line-of-sight observe the barcode, is now in initial widespread adoption throughout the world. There are a number of US patents touching on such technology, including U.S. Pat. No. 4,075,632, U.S. Pat. No. 4,739,328, U.S. Pat. No. 5,030,807, U.S. Pat. No. 5,777,561, U.S. Pat. No. 5,828,693, U.S. Pat. No. 5,850,181, U.S. Pat. No. 5,912,632, U.S. Pat. No. 5,995,019, U.S. Pat. No. 6,154,136, U.S. Pat. No. 6,288,629, U.S. Pat. No. 6,400,274 and U.S. Pat. No. 6,429,775.

There are however many hurdles to wider use of the technology. The difficulty of application of RFID to different environment and business processes pose a great challenge to the system integrators in the world. The fact that RFID reading operation requires the combined interdisciplinary knowledge of RF circuits, antennas, propagation, scattering, system, middleware, server software, and business process engineering is so overwhelming that it is hard to find one single system integrator knowledgeable about them all. Users are then forced to contract multiple companies to build the RFID infrastructure, and the inevitable difficulty in communication between companies slow down the deployment rate.

In view of the aforesaid situation, this present invention seeks to create and introduce novel technologies, namely redundant networked multimedia technology, auto-ranging technology, auto-planning technology, smart active antenna technology, plus novel RFID tag technology, to consolidate the knowledge of all these different disciplines into a comprehensive product family. An expert system like installation, monitoring and maintenance infrastructure thus link up all these technologies. The ultimate goal is to advance the state-of-the-art in RFED system and increase the ease of deployment, speed of deployment, and reliability of deployment of RFID system throughout the world.

The application of these RFID technologies include, but is not limited to, logistics, warehouse management, parking lot management, golf ball tracking, clothing and fashion industry, factory automation, produce tracking, baggage tracking, document management, human access control and tracking, etc. Actually, the fact that these technologies arise from these actual applications can probably be intuitively guessed from the description of the patent application.

SUMMARY OF THE INVENTION

According to a first aspect of the present invention, there is provided an RFID reader adapted to receive data from at least one RFID tag, and adapted to receive and/or transmit video/image and/or audio signals.

According to a second aspect of the present invention, there is provided an RFID system including an RFID reader and at least a server containing data of at least one pre-recorded video/image and/or audio file accessible by said RFID reader, wherein said RFID reader is adapted to receive data from at least one RFID tag, and adapted to receive and/or transmit video/image and/or audio signals.

According to a third aspect of the present invention, there is provided a method of operating an RFID system including at least an RFID reader adapted to receive data from at least one RFID tag, and adapted to receive and/or transmit video/image and/or audio signals, including steps (a) detecting data of at least one RFID tag; and (b) capturing video/image and/or audio data of an object carrying said at least one RFID tag.

According to a fourth aspect of the present invention, there is provided a method of operating an RFID reader, including steps (a) emitting illumination energy beam of a first power level when the RFID reader is at a first distance from the target RFID; and (b) emitting illumination energy beam of a first power level, which is lower than said first power level, when the RFID reader is at a second distance from the target RFID, which is shorter than said first distance.

According to a fifth aspect of the present invention, there is provided an RFID system including a plurality of RFID readers associated with means for controlling the operation of said plurality of RFID readers.

According to a sixth aspect of the present invention, there is provided an RFID calibration tag including three RFID tags oriented substantially perpendicular to one other.

According to a seventh aspect of the present invention, there is provided an RFID system wherein a power amplifier is connected at a transmitting antenna front-end.

According to an eighth aspect of the present invention, there is provided an RFID system wherein a low noise amplifier is connected at a receiving antenna front-end.

According to a ninth aspect of the present invention, there is provided an RFID system including an RF signal transmitting antenna and a plurality of RF signal receiving antennae, wherein said transmitting antenna is not collocated with all of said plurality of receiving antennae.

According to a tenth aspect of the present invention, there is provided an RFID system including an RF signal transmitting antenna and a plurality of RF signal receiving antennae, wherein each said receiving antenna contains a complete down-conversation receiver circuit and wherein all said receiving antennae are adapted to be turned on at the same time for true simultaneous multi-direction bistatic RFID operation.

According to an eleventh aspect of the present invention, there is provided an RFID system including a plurality of RF signal transmitting antennae and an RF signal receiving antenna, wherein not all the transmitting antennae are collocated with said receiving antenna.

According to a twelfth aspect of the present invention, there is provided an RFID system including a plurality of RF signal transmitting antennae and a plurality of RF signal receiving antennae, wherein said signal transmitting antennae and said signal receiving antennae may or may not be collocated with any of the other transmitting and receiving antennae.

According to a thirteenth aspect of the present invention, there is provided an RFID system including a plurality of RF signal transmitting antennae and one RF signal receiving antennae, wherein the transmitting antennae, when operating at different non-interfering frequency channels or hopping frequency sequences coming from an extended RFID reader with multiple frequency sources, are adapted to be turned on at the same time for true simultaneous multi-direction bistatic RFID operation.

According to a fourteenth aspect of the present invention, there is provided an RFID system including a plurality of RF signal transmitting antennae and a plurality of RF signal receiving antennae, wherein said transmitting antennae operate at different non-interfering frequency channels or hopping frequency sequences coming from an extended RFID reader with multiple frequency sources, wherein each said receiving antenna contains a complete down-conversion receiver circuit and they are adapted to be turned on at the same time for true simultaneous multi-direction bistatic RFID operation, and wherein each said receiving antenna with a complete down-conversion receiver circuit is adapted to work on one of the transmitting frequencies or hopping frequency sequences of the transmitting antennae.

According to a fifteenth aspect of the present invention, there is provided an RFID arrangement wherein an RFID tag is contained within an object.

BRIEF DESCRIPTION OF THE DRAWINGS

Preferred embodiments of the present invention will now be described, by way of examples only, with reference to the accompanying drawings, in which.

DETAILED DESCRIPTION OF THE PREFERRED EMBODIMENTS

Figure 1:
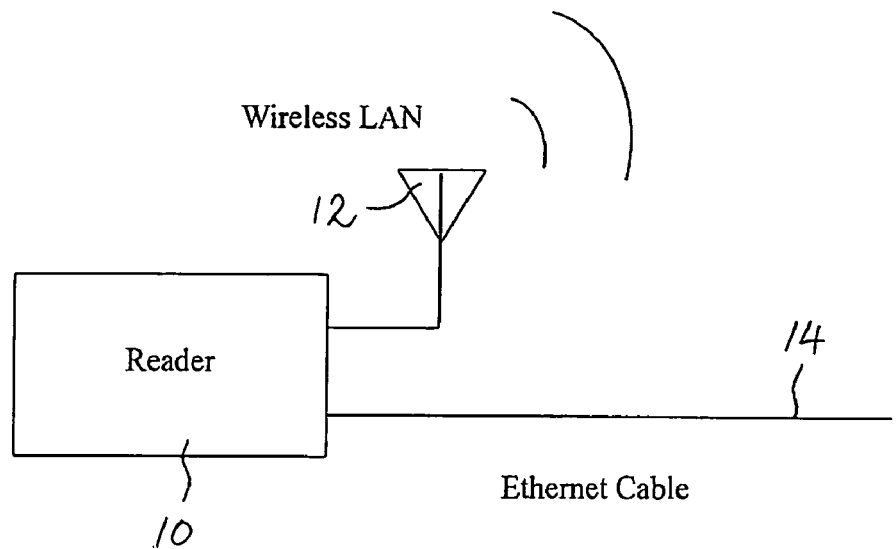
FIG. 1 shows a schematic diagram of part of a redundant networked multimedia RFID system according to the present invention.

A redundant networked multimedia RFID system according to the present invention entails the use of wireless LAN (Wi Fi) connection and Ethernet connection simultaneously for redundant network connectivity, as shown in FIG. 1. An RFID reader 10 in such a system is connected with the wireless LAN via an antenna 12 for emitting radio frequency (RF) signals to the outside environment, and is also connected with the remaining system via an Ethernet cable 14, thus providing redundant physical layer.

Figure 2:
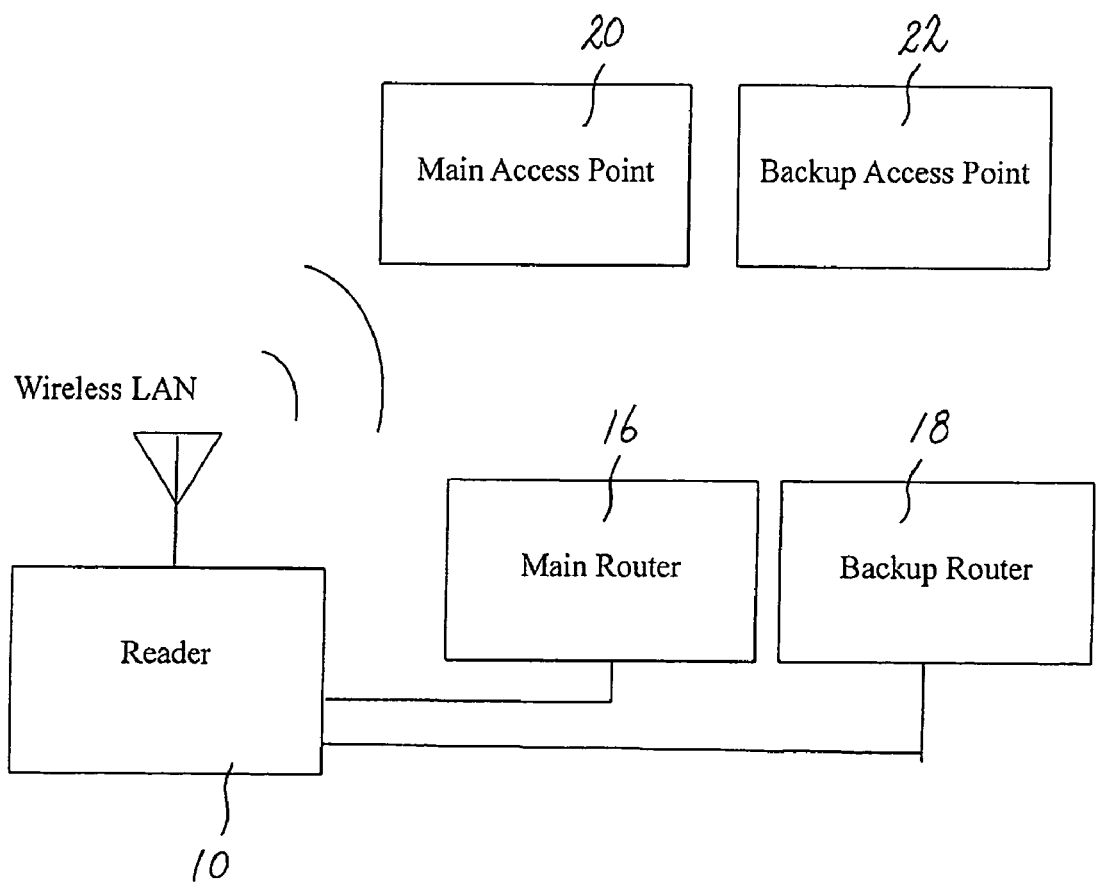
FIG. 2 shows in more detail the redundant networked multimedia RFID system of FIG. 1.
Figure 3:
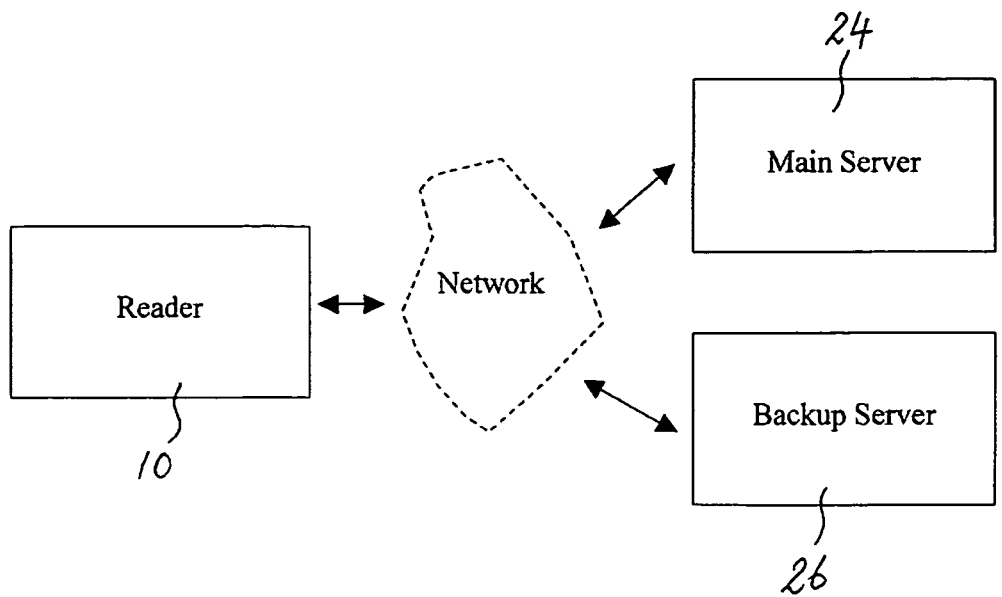
FIG. 3 shows a further part of the redundant networked multimedia RFID system of FIG. 1.

As shown in FIG. 2, the system is configured to automatically hunt for main router 16, backup router 18, main access point 20, and backup access point 22 for gateway redundancy. As shown in FIG. 3, the system is also configured such that the RFID reader 10 automatically hunts for main server 24 and backup server 26 for backend redundancy. Even if both servers 24, 26 cannot be found, the system will record data on internal non-volatile memory until a server comes up. In particular, the name (IP address) of the respective routers 16, 18, access points 20, 22 and gateways are pre-loaded into the reader 10. When there is a network unreachable situation, the reader 10 will try out the alternative router, access point, and gateway names (IP addresses) to try to re-connect via them. Similarly, the name (IP address) of the respective server 24, 26 are also pre-loaded into the reader 10. When the server cannot be reached, the reader 10 will automatically hunt for the other server by sending query messages directed to the server.

Figure 4:
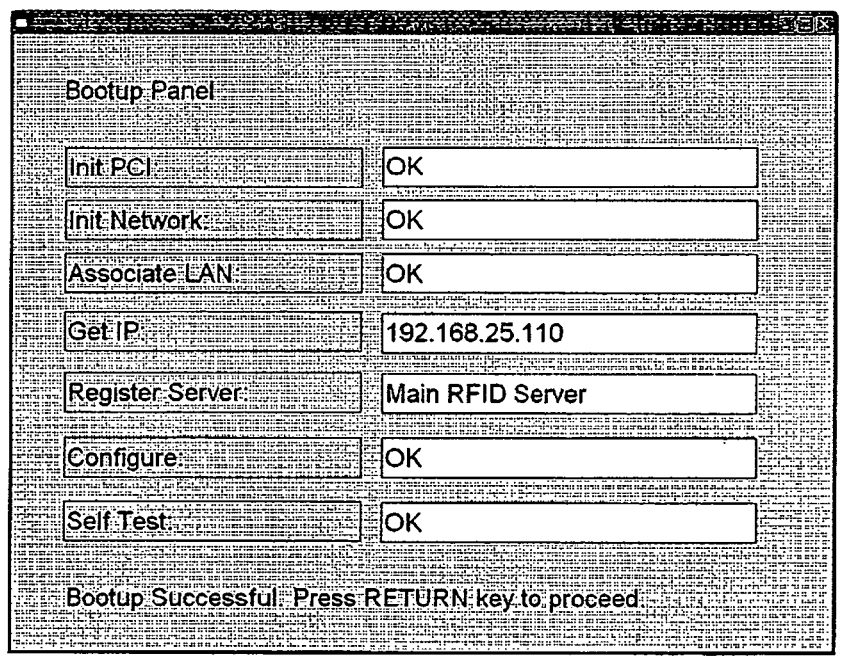
FIG. 4 shows a boot-up panel of the redundant networked multimedia RFID system shown in FIGS. 1 to 3.
Figure 5:
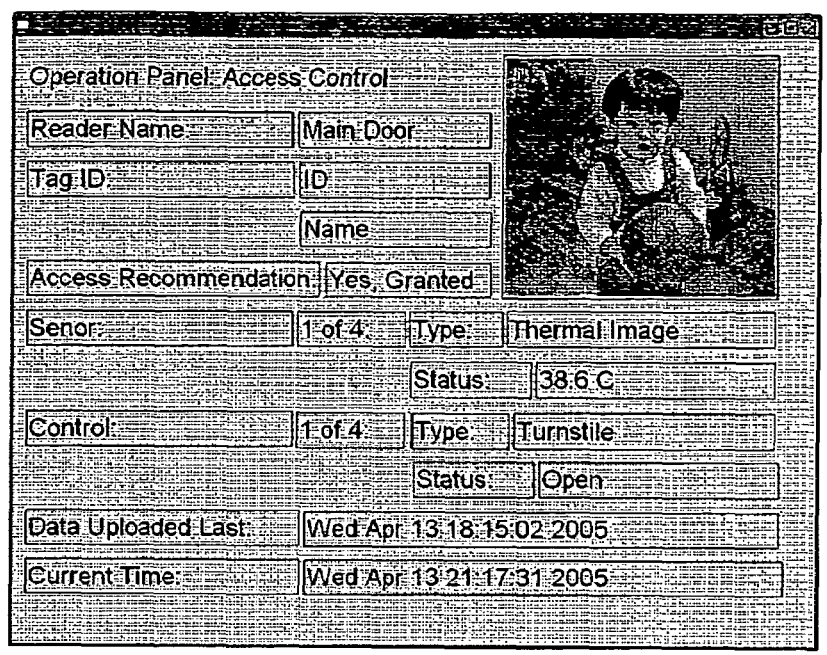
FIG. 5 shows an exemplary operation panel of the redundant networked multimedia RFID system shown in FIGS. 1 to 3.

The system provides output of video or graphic/image data. Such enables boot-up time user friendliness, as in the case of the boot-up panel as shown in FIG. 4. After reading RFID tags, one or more pictures of the product pre-loaded in the database are immediately downloaded from the database for visual verification by logistics handler or security guard or customer officer at the reader site, as in the exemplary operation panel shown in FIG. 5.

Figure 6:
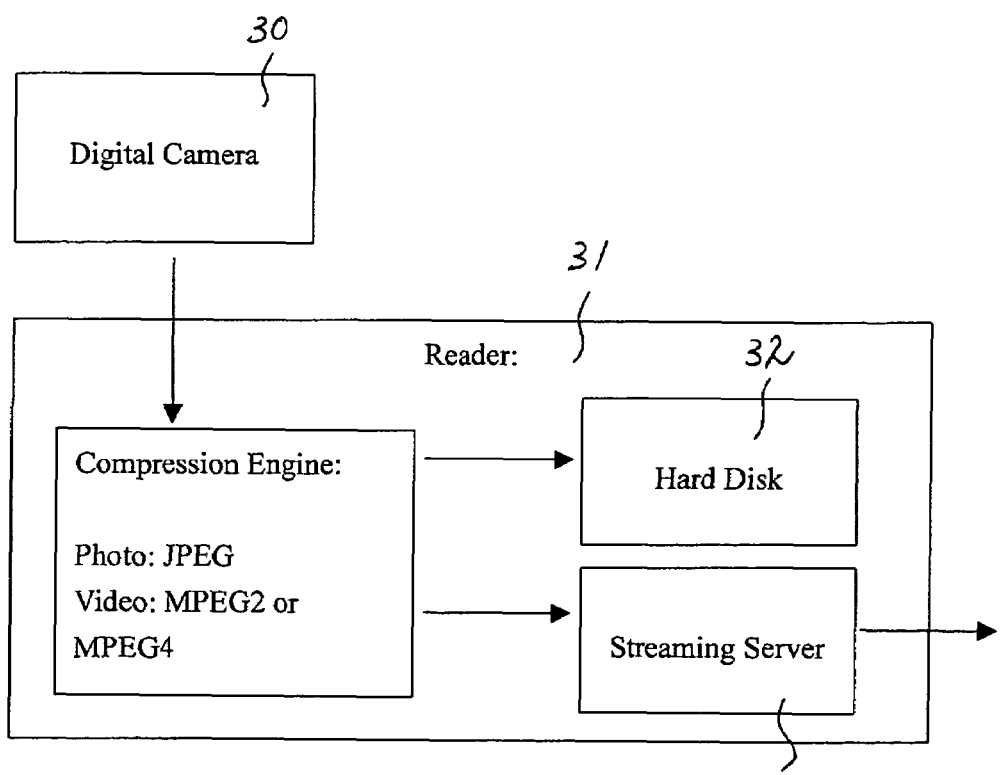
FIGS. 6 to 10 are various schematic diagrams of the redundant networked multimedia RFID system shown in FIGS. 1 to 3, showing various functions which can be carried out by this system.

The system also provides input of video or graphic/image data. This enables capture and recording of product look for future reference, verification or litigation. As shown in FIG. 6, a digital camera 30 captures images of a product in either image file format (e.g. JPEG) or video file format (e.g. MPEG2 or MPEG4) for storage in a database of a hard disk 32 of an RFID reader 31, and/or for subsequent output via a streaming server 34.

Figure 7:
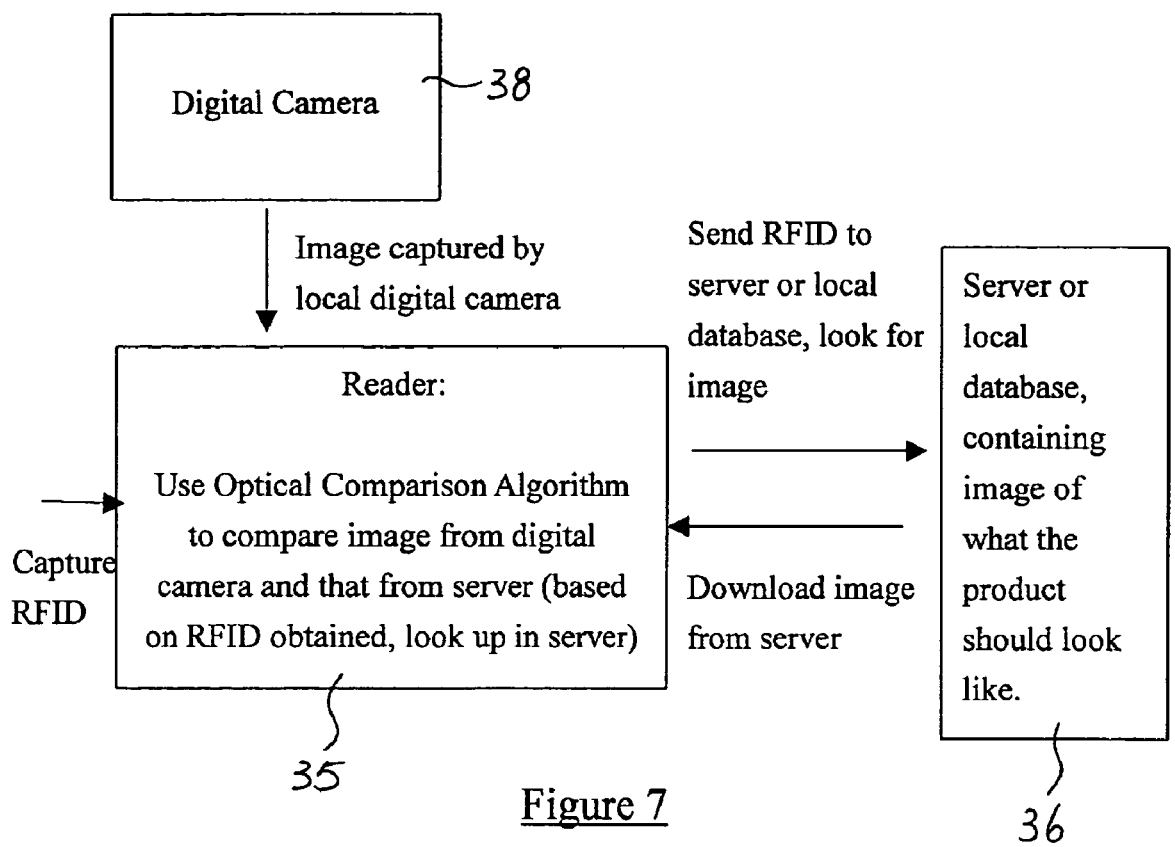

For products with pre-downloaded images or videos, real time image comparison may be carried out to verify product is indeed what is being applied for transit. As shown in FIG. 7, an RFID reader 35 first captures RFID data from an RFID tag. The RFID data are then sent to a server or a local database 36 for identification of corresponding images. The corresponding image data or video data are then downloaded from the server 36 back to the RFID reader 35. Images captured by a local digital camera 38 are fed to the reader 35 for comparison with the image data or video data downloaded from the server 36 back to the RFID reader 35, using an image comparison algorithm.

Figure 8:
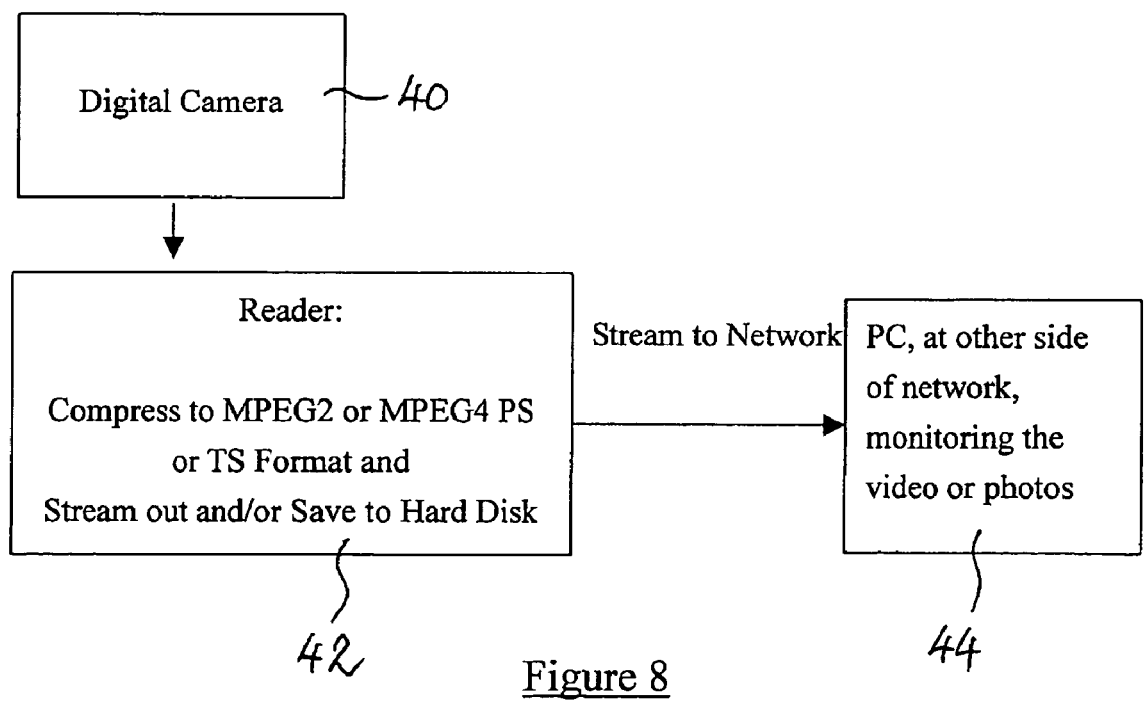

Such a system also allows for real time video streaming to the network for continuous monitoring, as shown in FIG. 8. A local digital camera 40 continuously captures video images of, say, a product and have such data fed to an RFID reader 42. The data are then compressed by the RFID reader 42 to MPEG2, MPEG4 PS or TS format for streaming out and/or storage in the hard disk of the RFID reader 42. In particular, such compressed data may be streamed out via a network to a personal computer 44 at another end of the network, enabling the video or photos to be monitored.

Figure 9:
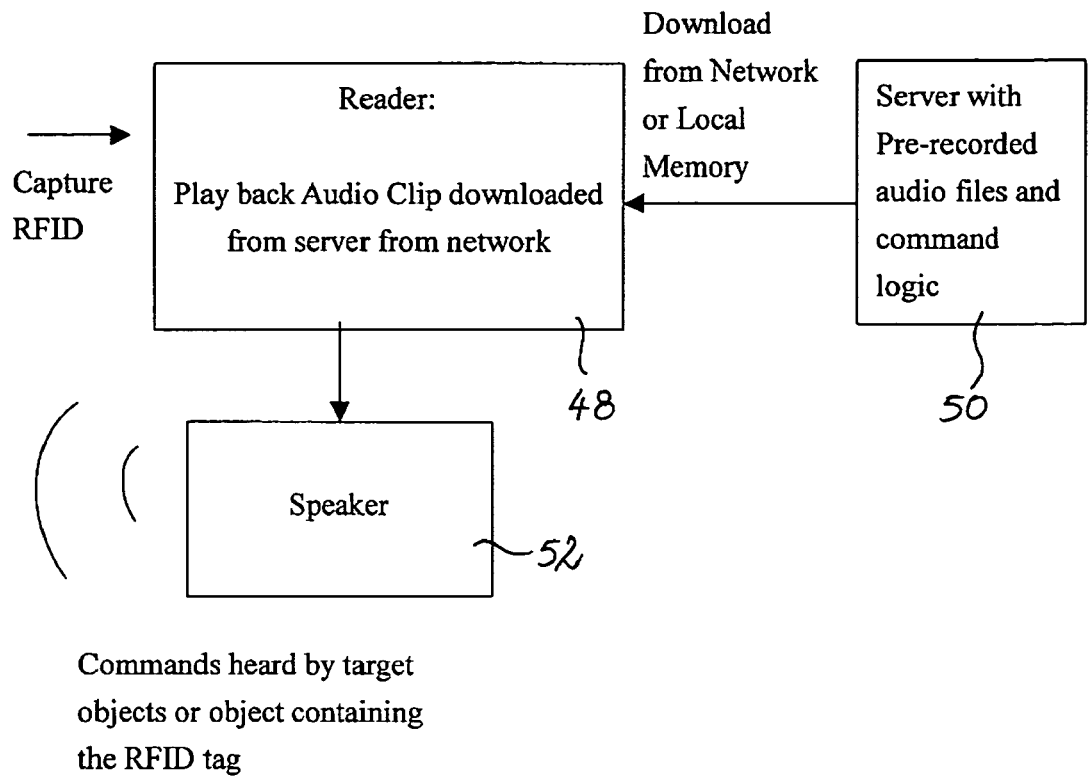

The system also provides output of audio signals, e.g. for providing audio cues for installation, boot-up help and guidance. In addition, such audio signals may provide audio commands during operation, with the audio signals pre-recorded and the logic defined by user. As shown in FIG. 9, an RFID reader 48, upon reception of RFID data form an RFFD tag, can download, either from a local memory, or via a network from a server 50, pre-recorded audio files and command logic. The downloaded audio clips are then played back and outputted via a speaker 52. Such pre-recorded audio clips may contain commands or instructions to be heard by target objects or object containing the RFID tag.

Figure 10:
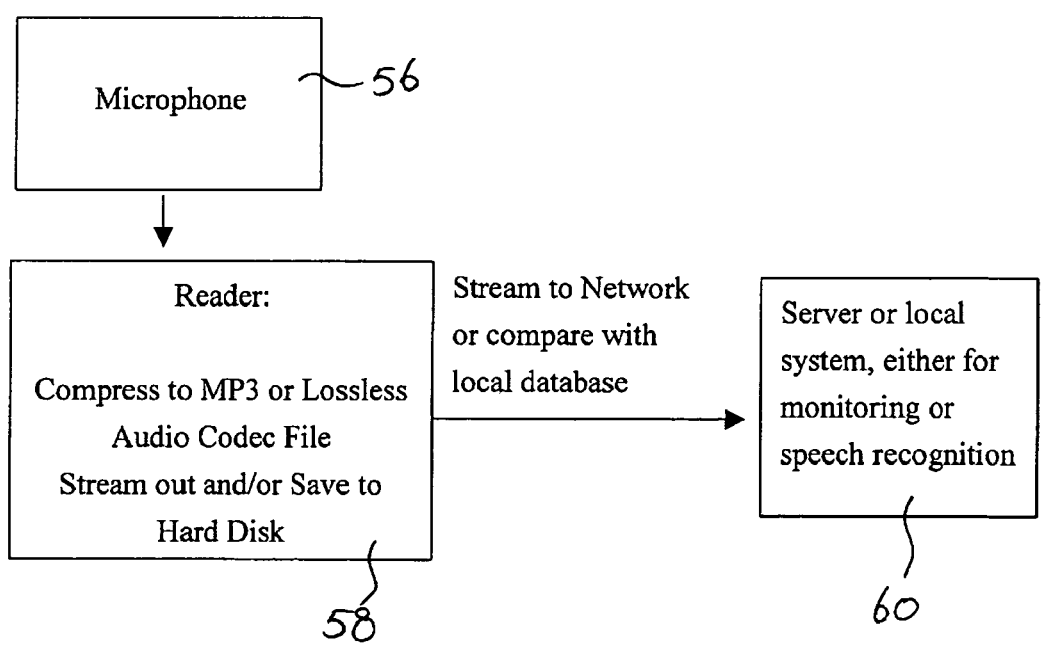

In addition, the system also provides input of audio signals, enabling capture of site audio information and signature. Furthermore, such allows interaction via the network for speech recognition. Operation of the system based on interactive security password on the basis of audio data is thus also possible. As shown in FIG. 10, a local microphone 56 is provided for reception of sound, e.g. from an individual carrying an RFID tag, and whose identity is to be ascertained. The individual speaks or makes certain sound into the microphone 56. The received signals are then fed to an RFID reader 58, and compressed to MP3 format or Lossless Audio Codec file, to be streamed out and/or stored in a hard disk of the RFID reader 58. The RFID reader 58 also receives RF signals from the RFID tag worn by the individual. The compressed audio data are then compared with pre-stored compressed audio data of that individual as stored in a server 60 or the hard disk of the RFID reader 58 for monitoring or speech recognition, e.g. for identification of the individual for security purpose.

Figure 11:
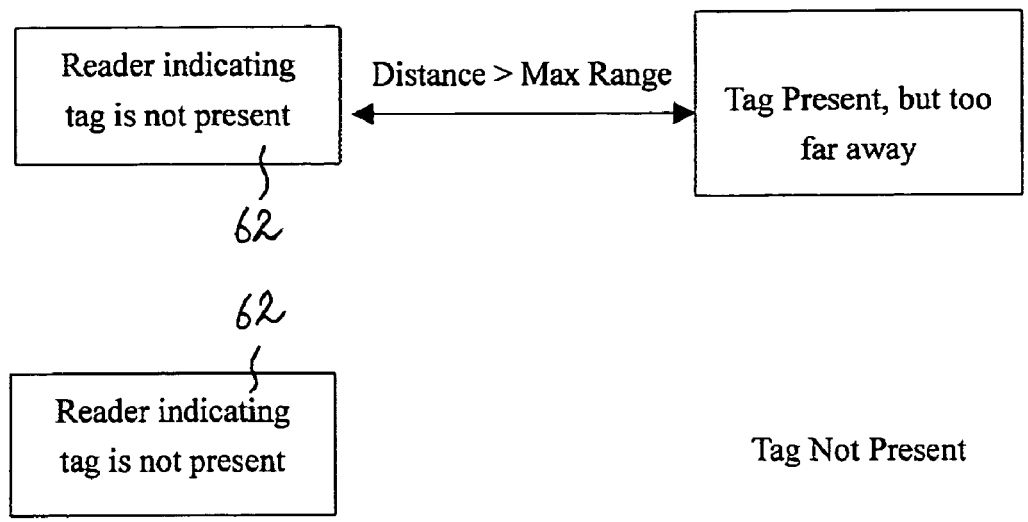
FIG. 11 shows the ambiguous situation faced by an RFID reader not receiving any RF signals from an RFID tag.

As shown in FIG. 11, when an RFID reader 62 indicates that a certain RFID is not present, such may mean that the target tag is present, but its distance from the RFID reader 62 is larger than the maximum operating range of the RFID reader 62 (as shown in (a)), or that the tag is truly not in the target area (as shown in (b)). Such ambiguity may be resolved if the distance between the RFID reader and the tag is known to the user of the reader. The distance between the reader and the tag can be found by using ultrasonic or laser range finder.

Figure 12:
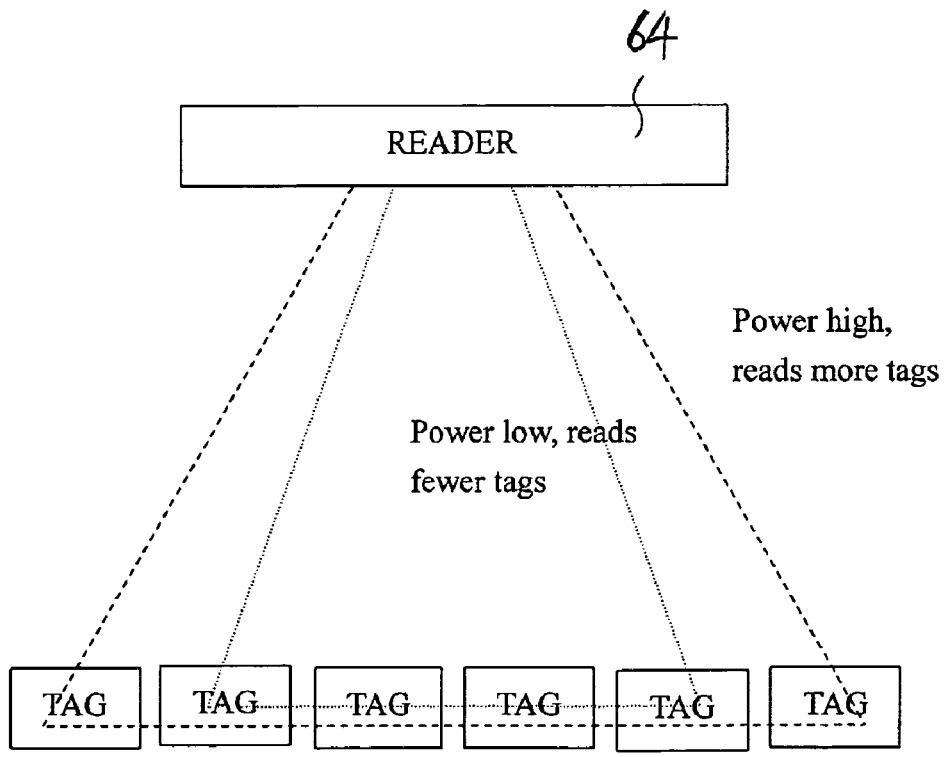
FIG. 12 shows generally the relationship between the power of the RFID reader and the number of tags which can be read.

The ambiguity as to whether the tag being read is the one in the main direction of the reader or is at the fringe of the illumination energy beam can be better resolved if the power of the reader can be gradually reduced as the reader approaches the tag in physical range. As shown in FIG. 12, with the same RFID reader 64, with a higher power of the illumination energy beam, more RFID tags can be reached, as compared with a lower power of the illumination energy beam.

Combining the use of range finding and the use of power management, one can apply gradual closing in equations, either linear, quadratic or exponential, to the power versus range and thus, using audio cues, help and guide the user to zoom in onto the target tag, i.e. the one where the ID has been keyed in for the purpose of search and find. An exemplary linear equation may be in the general form of:

$$Power = aR + b$$

where R is the range between the RFID reader and the target RFID tag;

a is a first constant; and b is a second constant which may, or may not, be equal to a.

An exemplary quadratic equation may be in the general form of:

$$Power = cR^2 + d$$

where R is the range between the RFID reader and the target RFID tag;

c is a third constant; and d is a fourth constant which may, or may not, be equal to c.

Figure 13:
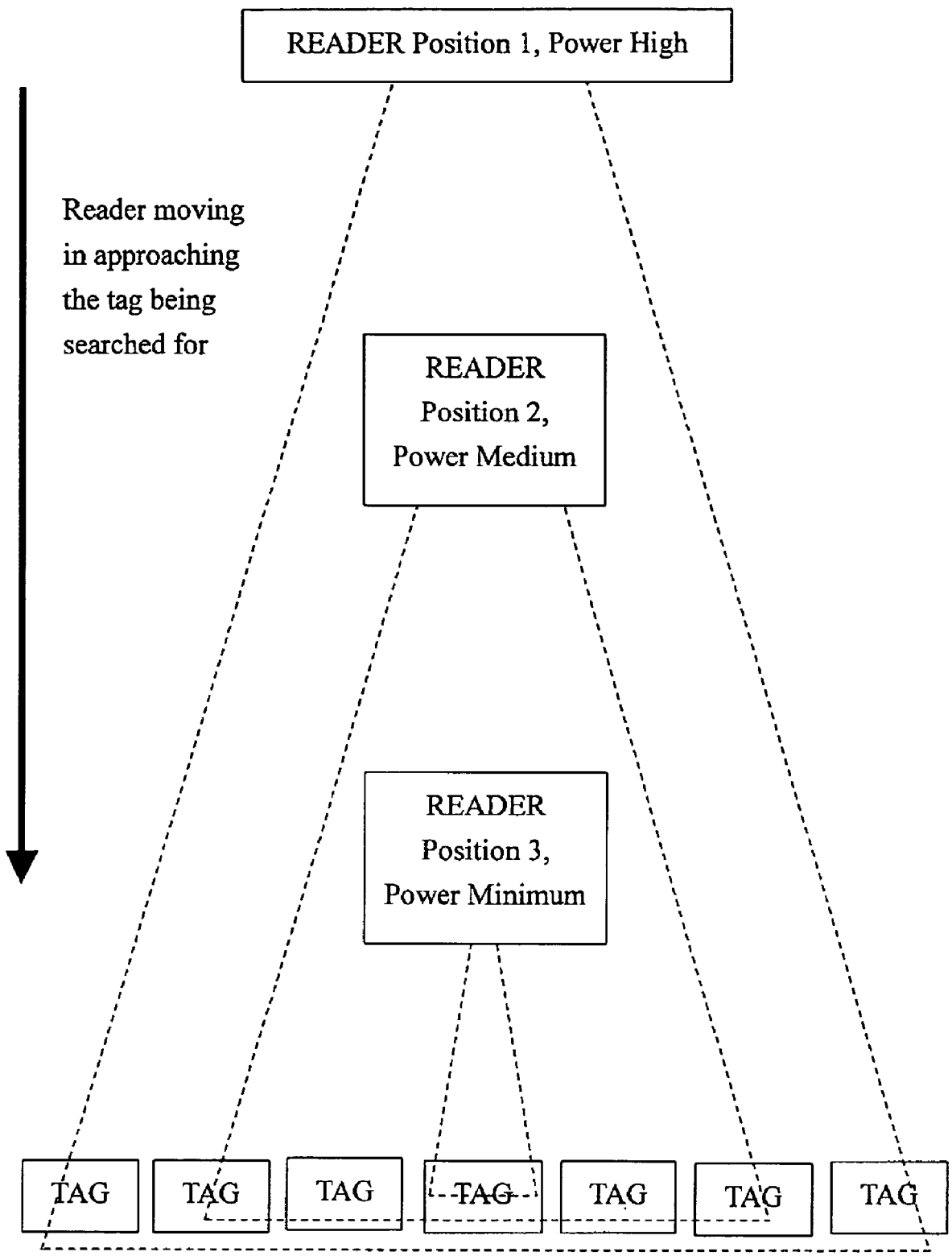
FIG. 13 shows the use of an auto-ranging RFID reader according to the present invention.

As shown in FIG. 13, when a person holding an RFID is at Position 1, which is furthest from the target tag, the illumination energy beam is emitted at its highest level of power, thus ensuring that the target tag is detected if it is within the maximum operating range of the RFID reader. As the person approaches the target tag, the power level of the RFID reader is reduced, e.g. to a medium level. If the target tag is then not detected, the person will know that he/she is not heading towards the right direction. On the other hand, if the target tag is still detected with this lowered level of power, he/she can be confident that he/she is heading towards the right direction. The power level of the illumination energy beam of the RFID reader may thus be continuously reduced while the person holding the RFID reader continues to approach (zoom in) the target tag in an interactive manner, until the target tag is located.

Figure 14:
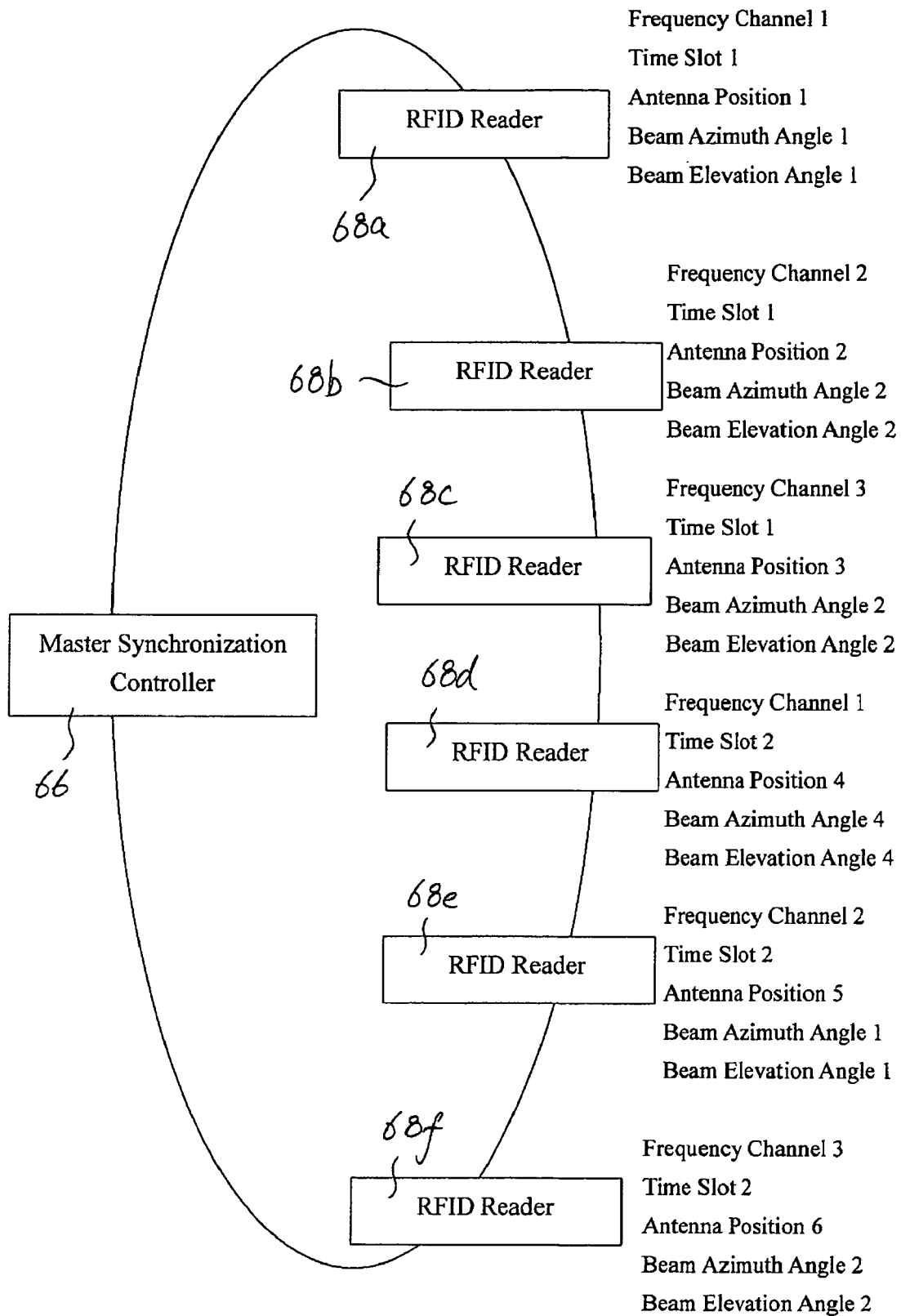
FIG. 14 shows the association of a number of RFID readers with a master synchronization controller according to the present invention.

An auto-planning RFID reader system is shown in FIG. 14, in which a Master Synchronization Controller (MSC) 66 manages all RFID readers 68a, 68b, 68c, 68d, 68e, 68f within an area, checking each of their operation and interferences on each other, planning their frequency channels, code sequences, time slots, spatial position and beam pointing directions, and other parameters, i.e. generally allocating resources among the RFID readers. For example, it can be seen that no two readers use the same frequency channel at the same time, and each has a different antenna position.

The MSC 66 is an embedded system on the network, and its operating system (OS) is Linux®. The MSC 66 coordinates all the RFID readers 68a, 68b, 68c, 68d, 68e, 68f and antennae by regular communication with such readers. If the antennae work on time division multiplexing, the MSC 66 is responsible for sending out broadcasting synchronization signals. If the readers 68a, 68b, 68c, 68d, 68e, 68f work on frequency division multiplexing, the MSC 66 is then responsible for regulating evaluating the noise situation at each reader and antenna position and re-assign frequency if necessary.

Figure 15:
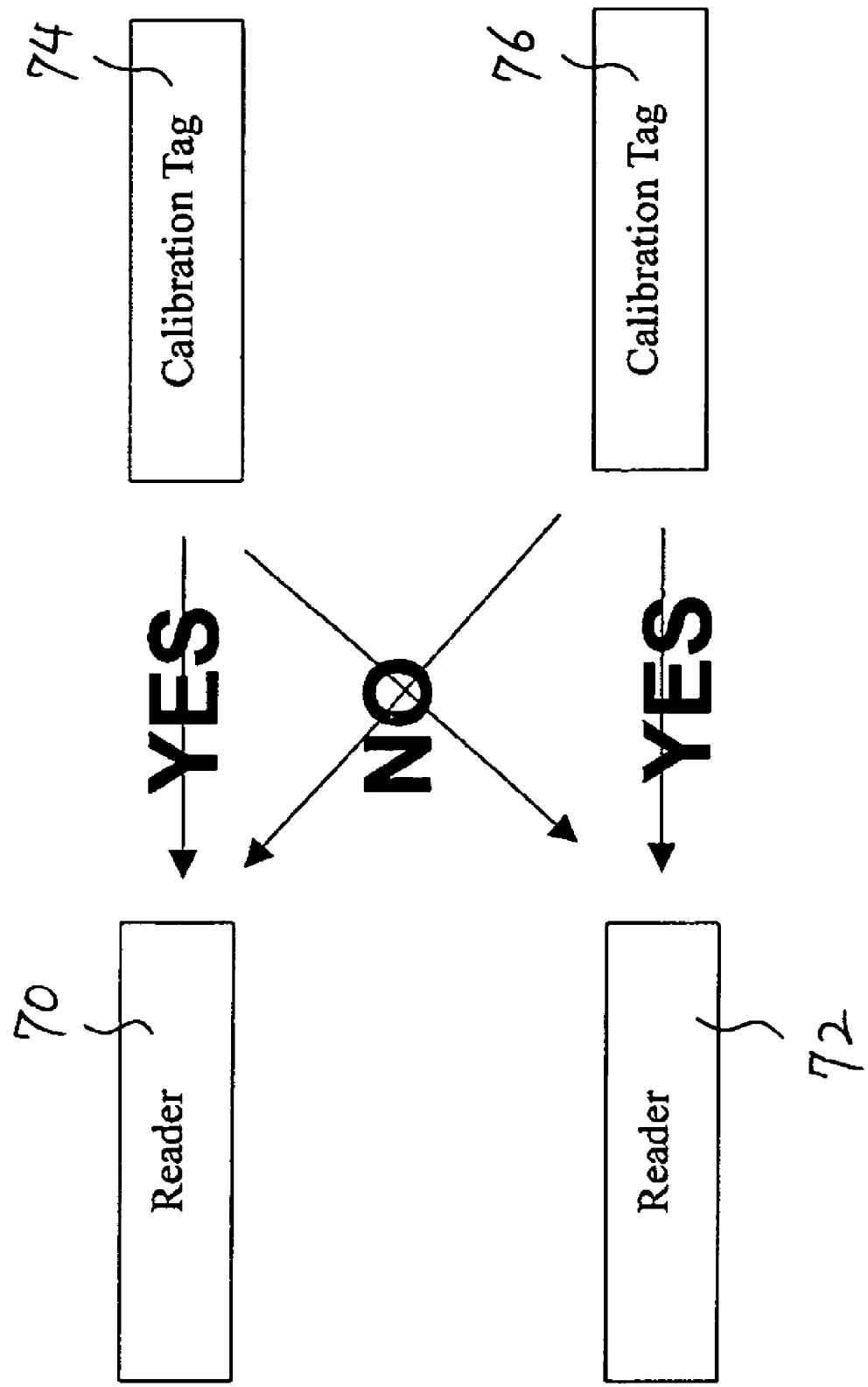
FIG. 15 shows the interaction of calibration tags and RFID readers.

Calibration tags, each consisting of three passive RFID tags, one vertically positioned, one horizontally positioned and one longitudinally positioned, such that the three RFID tags are perpendicular to one another, are placed at strategic points in space to mimic the location of RFID tags for the evaluation of tag responses under illumination by readers' antennae. As shown in FIG. 15, the responses are both measured at RFID readers 70, 72 and also locally within the calibration tag. Within the calibration tag, the three polarizations of E fields are measured using three calibrated antennae and the value sent back to the MSC 66.

In particular, the calibration tag is also an embedded system with wireless LAN, battery powered and contains a passive tag in the front in a horizontal orientation, a passive tag in the front in a vertical orientation, and a passive tag in the front in longitudinal orientation. There are also three antennae inside, oriented similarly as the three passive tags, with LAN and power detector connected.

Strategic points mentioned above include actual tag-present zone, i.e. the place in which the tags will physically be present. If the tags move during operation, the calibration tag need also be on the move. For all such strategic points, a matrix of four by four points, horizontally placed, 0.5 meter apart, will be measured.

The three values of the three polarizations of E fields as measured will be fitted into an equation to calculate whether the field illumination has reached the necessary threshold for tag integrated circuit (IC) operation.

The idea is that there should be no interference between the working of the two RFID readers 70, 72 in the target area. In particular, when the RFID reader 70 sends out signals trying to locate a calibration tag 74, the response signals from the calibration tag 74 should only be detected by the RFID reader 70, but not by the RFID reader 72 in the same area. Similarly, when the RFID reader 72 sends out signals trying to locate a calibration tag 76, the response signals from the calibration tag 76 should only be detected by the RFID reader 72, but not by the RFID reader 70. The power of the two RFID readers 70, 72 may thus be adjusted until an optimum operating power for each of the two RFID readers 70, 72 is reached.

Figure 16:
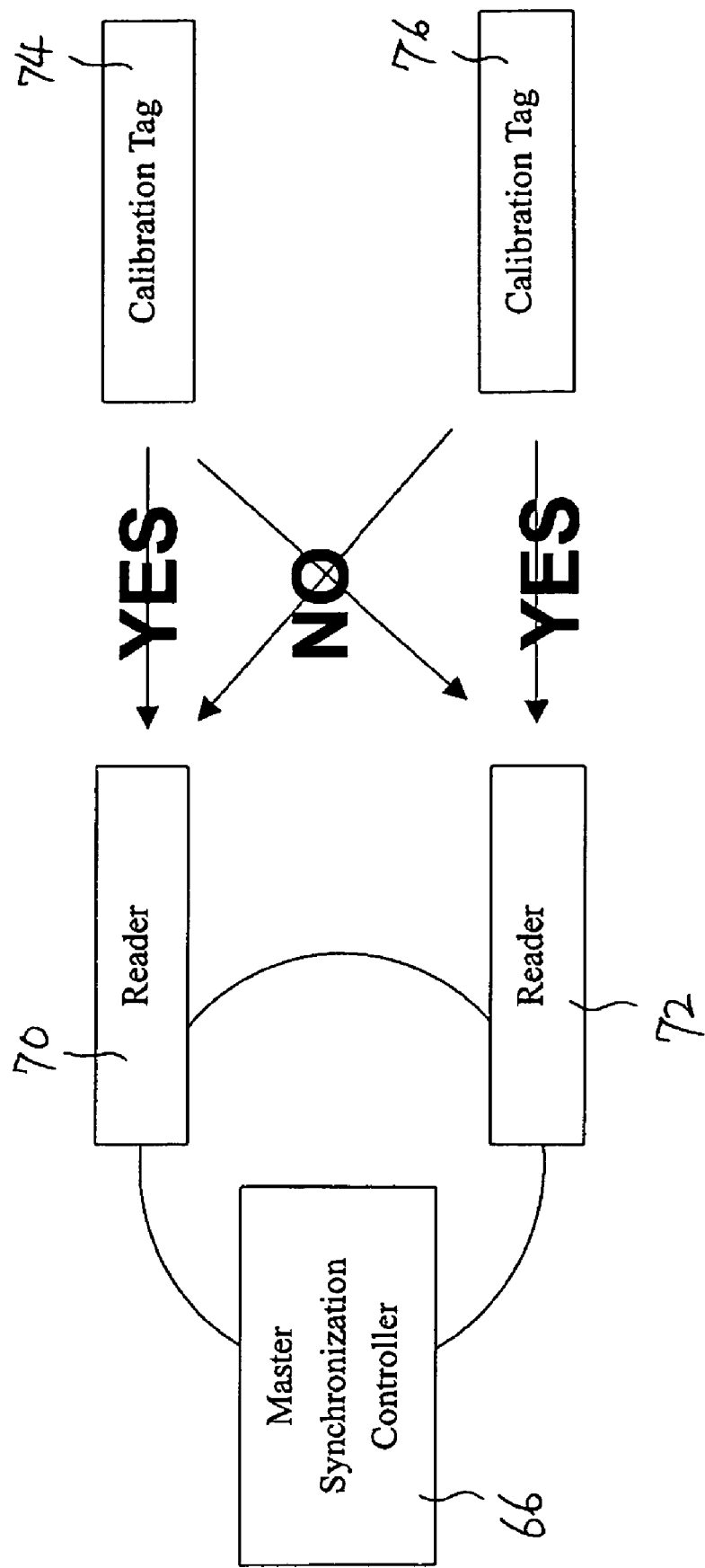
FIG. 16 shows the interaction of calibration tags and RFID readers associated with a master synchronization controller according to the present invention.

When the MSC 66 and the calibration tags are used in a closed loop feedback manner, the system integrator can automatically carry out planning of reader placement and set up, as shown in FIG. 16. Such work can be done in a fully automatic expert system manner, with minimal human intervention by entry level staffs following instructions at the LCD display of the MSC 66 and the calibration tags 74, 76.

Figures 17A, 17B:
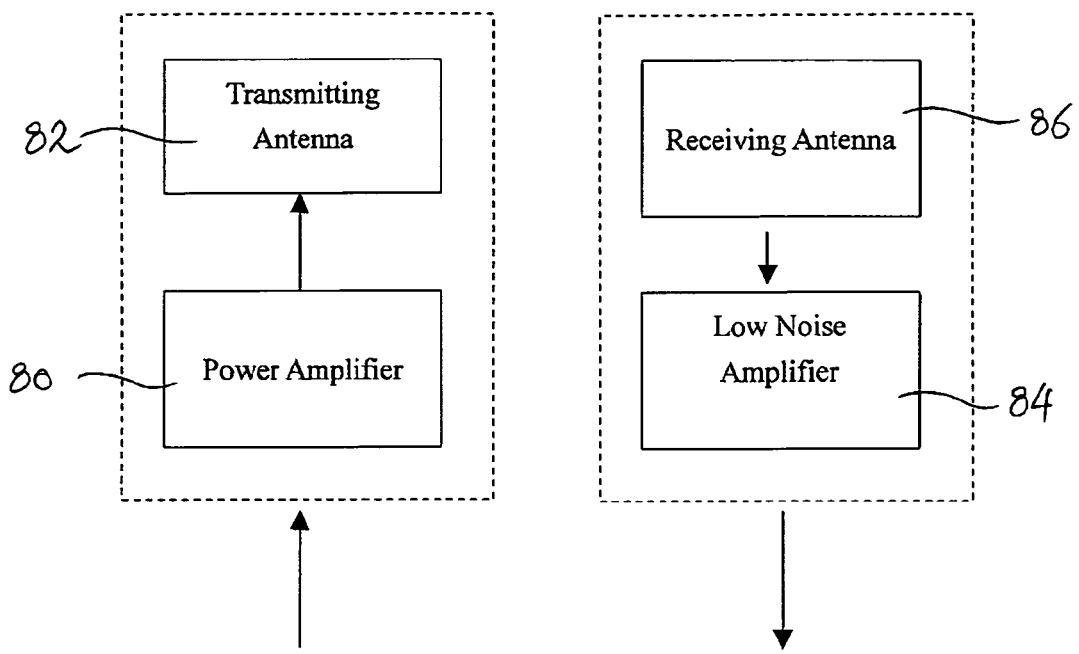
FIG. 17A shows schematically an active transmitting antenna according to the present invention.
FIG. 17B shows schematically an active receiving antenna according to the present invention.

In a smart active antenna RFID reader according to the present invention, a power amplifier 80 is provided at an transmitting antenna 82 front-end, as shown in FIG. 17A so that the length of cable to the transmitting antenna no longer matters much. A low noise amplifier 84 is also provided at a receiving antenna 86 front-end, as shown in FIG. 17B, so that the length of cable to the receiving antenna again does not matter much.

Figure 18:
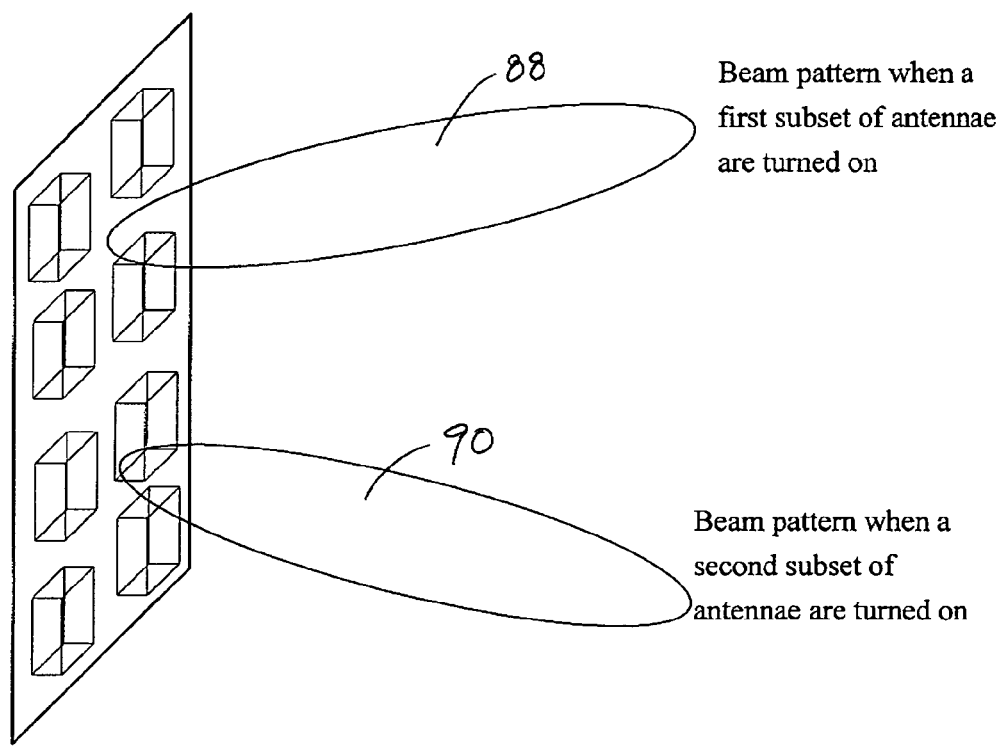
FIG. 18 shows the use of antenna switching technology in an RFID system according to the present invention.

As shown in FIG. 18, an RFID system according to the present invention also entails use of antenna switching technology to selectively turn on a subset of a group of antennae to generate different beams to illuminate different portions of the target. In particular, the transmit beam does not have to be aligned to the receive beam. They can be the same or can be different. Their origination point can also be different for true bistatic operation. As shown in FIG. 18, a beam pattern 88 ensues when a first subset of antennae are turned on, whereas a beam pattern 90 ensues when a second subset of antennae are turned on.

This is important as one can then methodically illuminate a different portion of the target area/space and thus different tags. With fewer tags illuminated, they can respond to the RFID reader much faster with fewer collisions. The RFID reader can thus capture all RFIDs in a piecemeal fashion.

Figure 19:
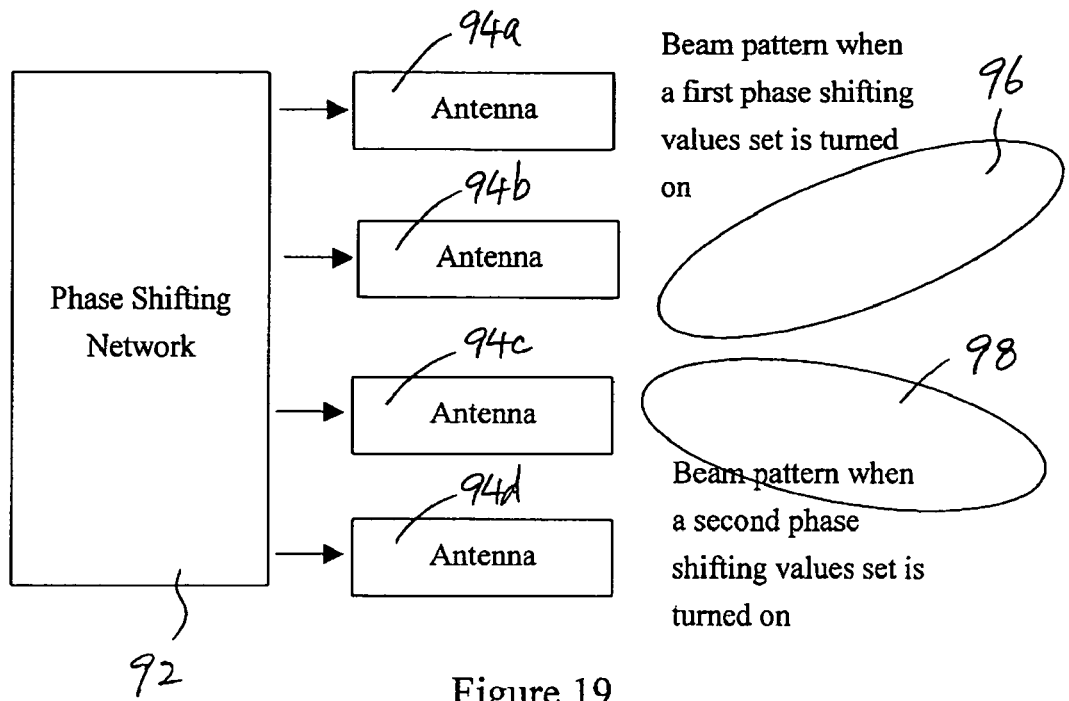
FIG. 19 shows the use of phase shifting technology in an RFID system according to the present invention.

The system also entails the use of phase shifting technology to steer the illumination energy beam in different directions to illuminate different portions of the target area/space. In particular, the transmit beam does not have to be aligned to the receive beam. They can be the same or can be different. Their origination point can also be different for true bistatic operation. As shown in FIG. 19, a phase shifting network 92 is connected with four antennae 94a, 94b, 94c, 94d. When a first phase shifting value is turned on, the beam pattern 96 will ensue, whereas when a second different phase shifting value is turned on, the beam pattern 98 will ensue. As in the case discussed in the preceding paragraph, steering the illumination energy beam will ensure that only a smaller population of RFID tags will be energized to the required level for operation, and thus they can respond to the RFID reader with fewer collisions. Again, the RFBD reader can thus capture all RFIDs in a piecemeal fashion.

Figure 20:
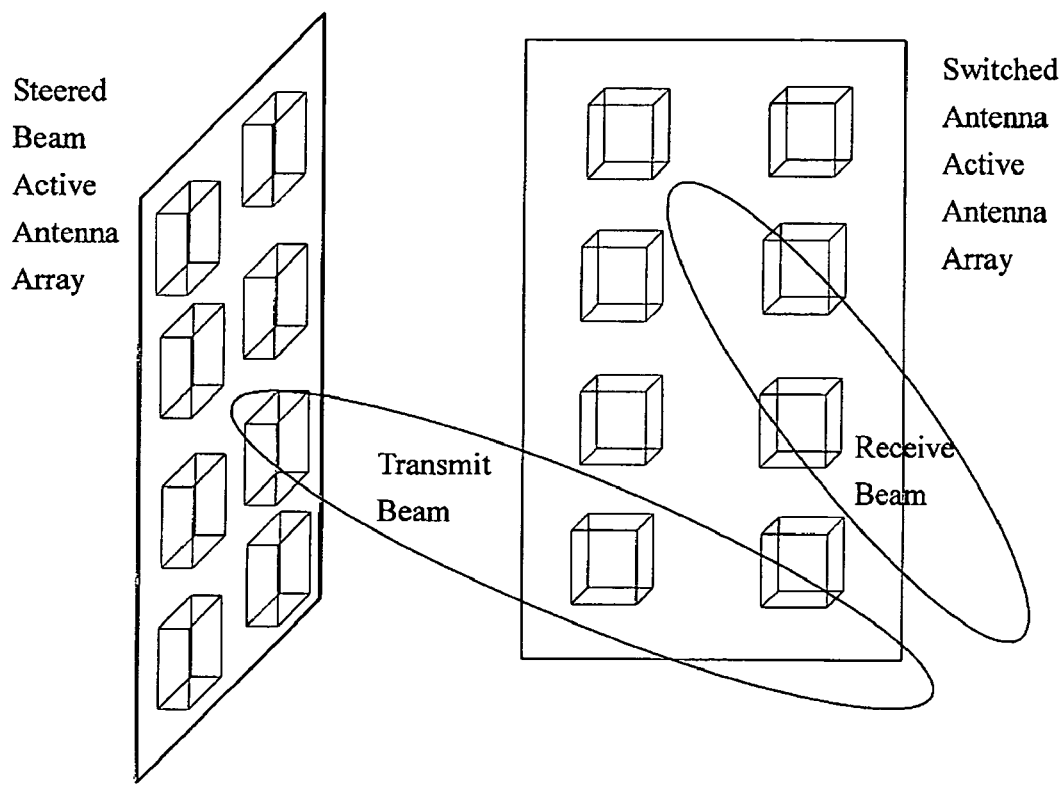
FIG. 20 shows the use of both antenna switching technology and phase shifting technology in an RFID system according to the present invention.

The system can combine the use of amplifiers at the transmitting end and receiving end, switched antenna (antenna switches) array and steered beam (electronic phase shifters) array to direct the energy in different directions and to direct the receive sensitivity in different directions, from different origins, as shown in FIG. 20.

Figure 21:
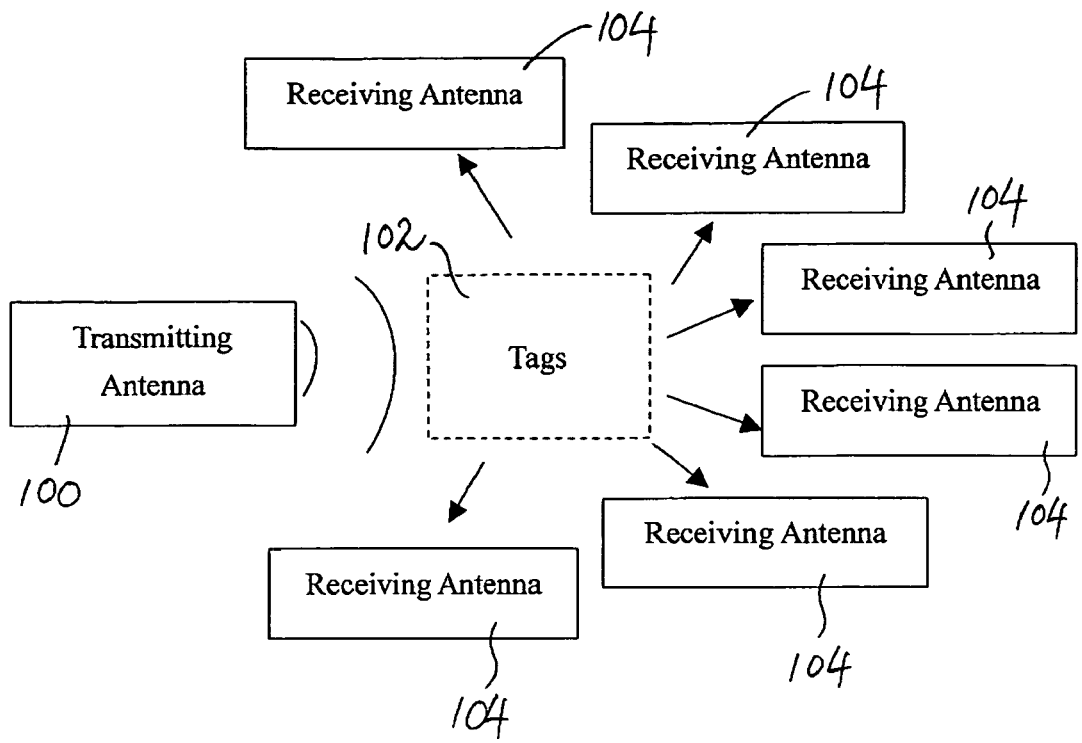
FIG. 21 shows the use of one transmitting receiver and a number of receiving antennae in an RFID system according to the present invention.

In one embodiment, and as shown in FIG. 21, the system uses a single transmitting antenna 100 to send out energy to RFID tags 102, yet uses a number of receiving antennae 104 to pick up tag response from various angles and various physical positions. As can be expected, the transmitting antenna 100 and the receiving antennae 104 need not be collocated.

Figure 22:
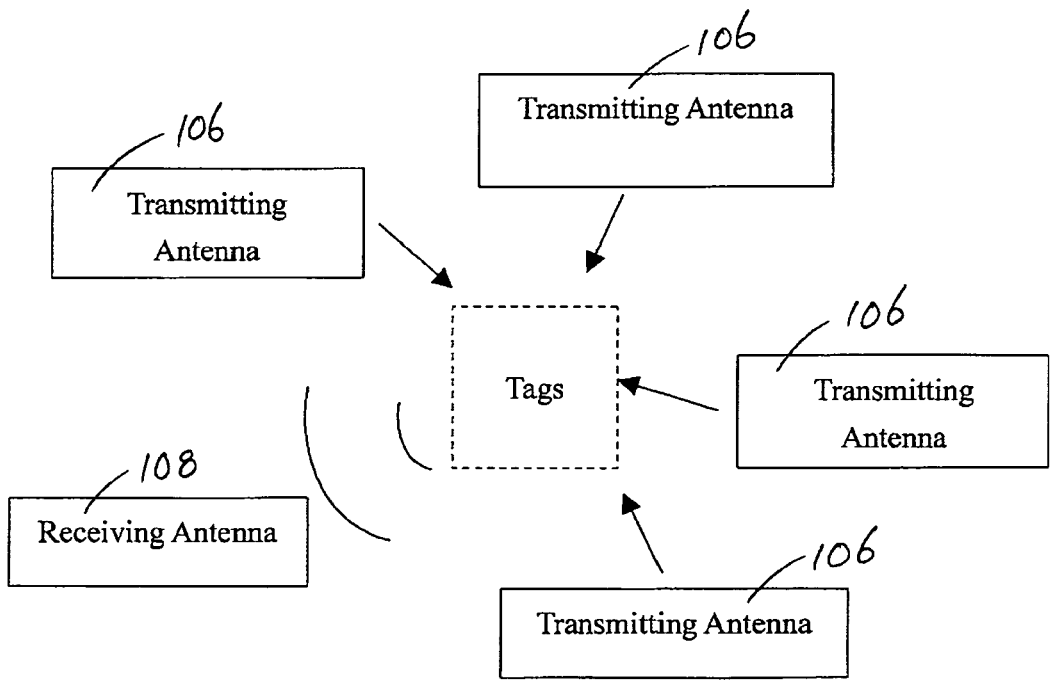
FIG. 22 shows the use of one receiving antenna and a number of transmitting antennae in an RFID system according to the present invention.

As shown in FIG. 22, the system may also use a number of transmitting antennae 106, either in sequence or simultaneously to, with a single receiving antenna 108. The various transmitting antennae 106 are configured in various ways such that either spatial diversity collimation is achieved or temporal diversity collimation is achieved. Again, as can be expected, the transmitting antennae 106 and the receiving antenna 108 need not be collocated.

In this connection, spatial and temporal diversity collimation takes advantage of the fact that a moving object in a spatial field is like a boat going through crests (ups) and troughs (downs) of a wave a waterway. If the wave is regular, then the boat will go through a limited range of ups and downs. If there are more exciter of the wave, so that the wave pattern becomes more complicated, then the wave will more likely have higher peaks and deeper troughs and, during those high peaks, the boat will be bounced up higher by the waves. Moreover, the number of peaks and troughs per area or per volume will increase in all directions, so that the chance that a tag is in an illuminated area or volume is higher.

By spatial diversity collimation, due to wave propagation and scattering characteristics because of the different geometric nature of incoming RFID tags, and the payload that comes with the tag (e.g. pallet of goods), the wave will have multi-path interference in and out of phase that is not the same from day to day. Depending on whether the position of the tag is in an in phase or out of phase position (which can vary by 20 dB in power), the tag will function or not. By adding more antennae and turning them on in different patterns, the signal reaching the same spot will have more chance to become in phase (collimate) and hence enabling the tags to receive enough energy to operate.

As to temporal diversity collimation, due to the movement of the RFID tag and the associated payload, by having a multiple of antenna switching on and off at different time, the probability that the tag is within the illumination of at least one antenna during the time the RFID tag traverses the energy field zone of the antennae is higher.

The system also entails, as shown in FIG. 23, the use of a multiple of transmitting antennae 110 and a multiple of receiving antennae 112 at different physical positions and angles to send energy into the zone of interest and receive response from tags 114 within the region. Again, spatial diversity collimation or temporal diversity collimation is achieved.

Figure 23A:
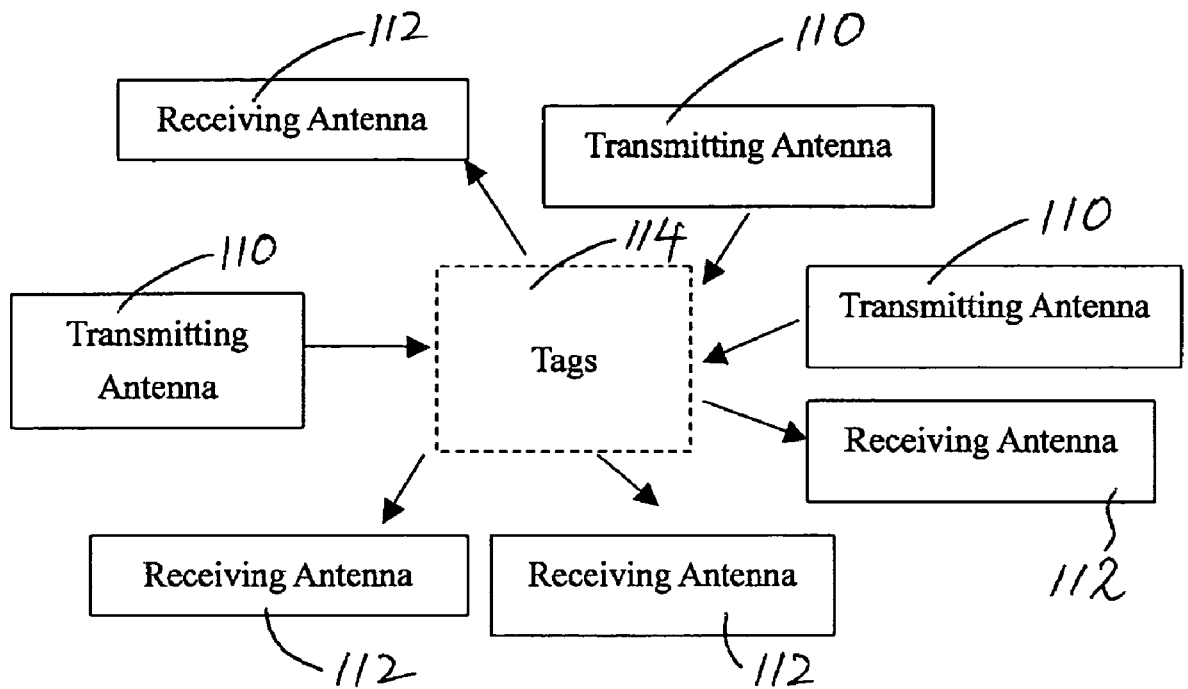
FIG. 23A shows the use of a number of receiving antennae and a number of transmitting antennae in an RFID system according to the present invention.
Figure 23B:
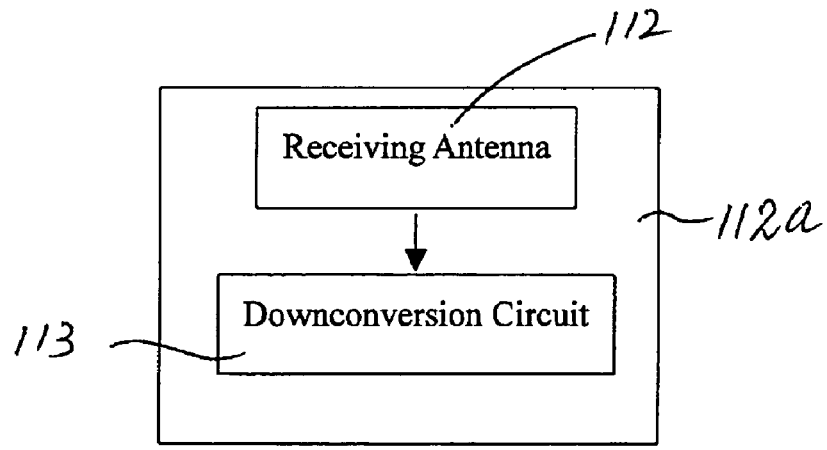
FIGS. 23B and 23C show an extension of the arrangement of FIG. 21, where the receiving antennae contain complete down-conversion circuit to enable them to be turned on simultaneously.
Figure 23C:
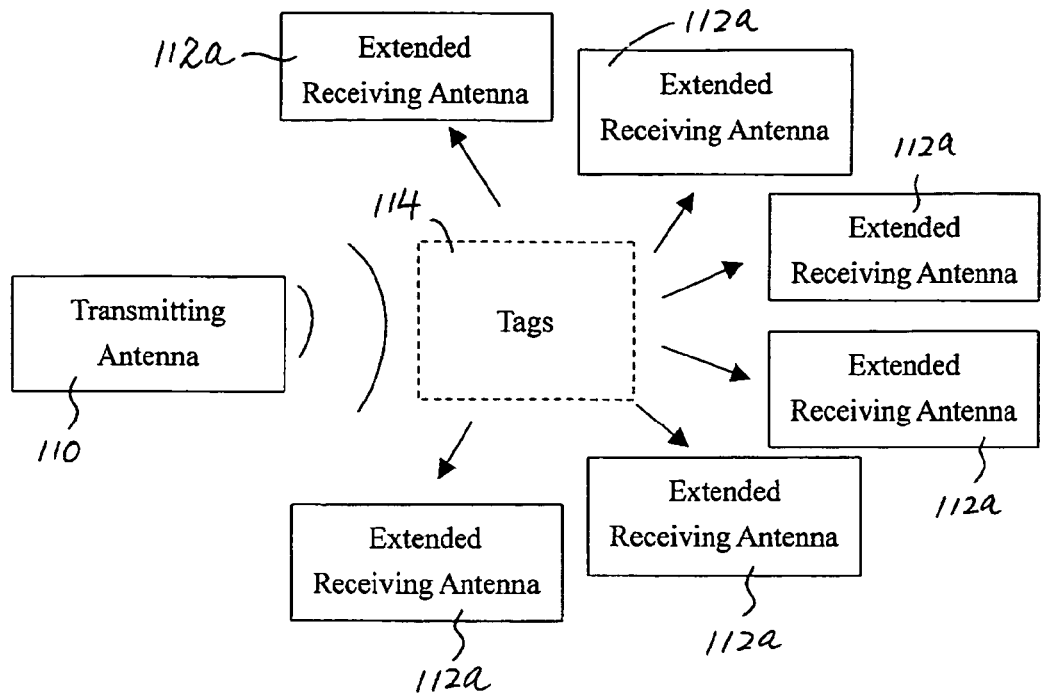

As shown in FIGS. 23B and 23C, the system entails an extension of the configuration shown in FIG. 21, i.e. single-transmit multiple-receive, in which the active receiving antenna 112 also contains a complete down-conversion block 113 (now termed an "extended receiving antenna" 112a) so that simultaneous reception can be achieved. In this arrangement as shown in FIG. 23C, the multiple receiving antennae are not switched in time (no time slotting), but are actually all working at the same time. This will enable true simultaneous multi-direction bistatic RFID reader operation. This is because in a typical application, the strongest scattering direction from the tag may not be in the backward direction but may be in some other directions. This direction will in fact also change from case to case and from environment to environment, depending on the content of the payload and the metal content in the environment. A further complication is that the strongest scattered direction RF energy may encounter a series of absorptive structure (e.g. bottles of water) or reflective structure (e.g. packages of batteries) so that such strongest scattered waves can never reach the receiving antenna in that direction in strength higher than the sensitivity threshold of the receiving system—in other words, the tag would not be detected. A further complication is that the interference of multipaths in the environment will cause peaks and nulls to occur, and since the payload may be moving at a high speed through the field—the moment it is in an illuminated area, the next moment it is not—so that time is of essence, and so that for each illumination by the transmitting antenna 110, all the receiving antennae 112a must be turned on to maximize the probability of reception. To ensure the best possible reception in all situations, the receiving antennae (with full blown receiver circuit inside) 112a are all turned on. This is particularly useful for high mobility RFID applications, such as tagged pallets or tagged cases or even tagged items in, but not limited to, distribution centres, logistics warehouse conveyor belts, etc.

Figure 23D:
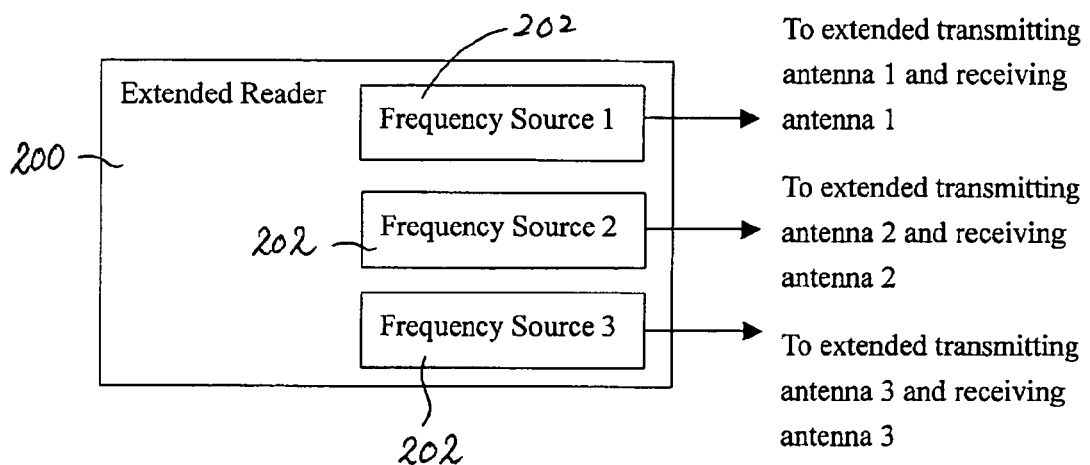
FIGS. 23D and 23E show an extension of the arrangement of FIG. 23A, allowing the transmitting antennae to operate at different non-interfering frequency channels or hopping frequency sequences so that they can be turned on simultaneously.
Figure 23E:
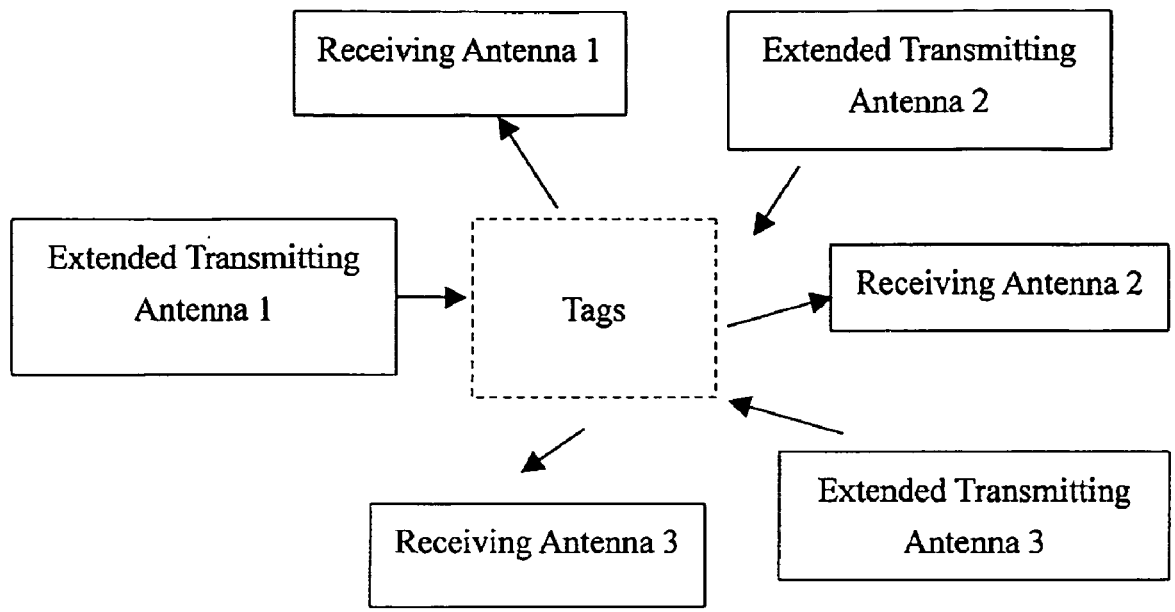

Similarly, and as shown in FIGS. 23D and 23E, the system also entails an extension of the configuration shown in FIG. 23A, i.e. multiple-transmit multiple-receive, in which the active transmitting antennae operate at different frequency channels (non-interfering channels) or hopping frequency sequences, from an extended RFID reader 200 with a number of frequency sources 202, so that simultaneous transmission can be achieved. In this arrangement, the multiple transmitting antennae are not switched in time (no time slotting), but are actually all working at the same time. This will enable true simultaneous multi-direction bistatic RFID reader operation. This is because in a typical application, the strongest incoming direction to the tag may not be in one particular direction which is the mounting position of one antenna toward the payload, but may be in some other directions. This direction will in fact also change from case to case and from environment to environment, depending on the content of the payload and the metal content in the environment. A further complication is that the strongest incoming direction RF energy may encounter a series of absorptive structure (e.g. bottles of water) or reflective structure (e.g. packages of batteries) so that such strongest wave may never reach the tag in that direction in strength higher than the turn-on AC power of the tag—in other words, the tag would not be activated. A further complication is that the interference of multipaths in the environment will cause peaks and nulls to occur, and since the payload may be moving at a high speed through the field—the moment it is in an illuminated area, the next moment it is not—so that time is of essence, and so that for each passing of the tag, all the transmitting antennae must be turned on to maximize the probability of hitting the tag with sufficient energy. To ensure the best possible illumination in all situations, the antennae (with different non-interfering frequency channels or hopping frequency sequences inside) are all turned on. This is particularly useful for high mobility RFID applications, such as tagged pallets or tagged cases or even tagged items in, but not limited to, distribution centres, logistics warehouse conveyor belts, etc.

Figure 23F:
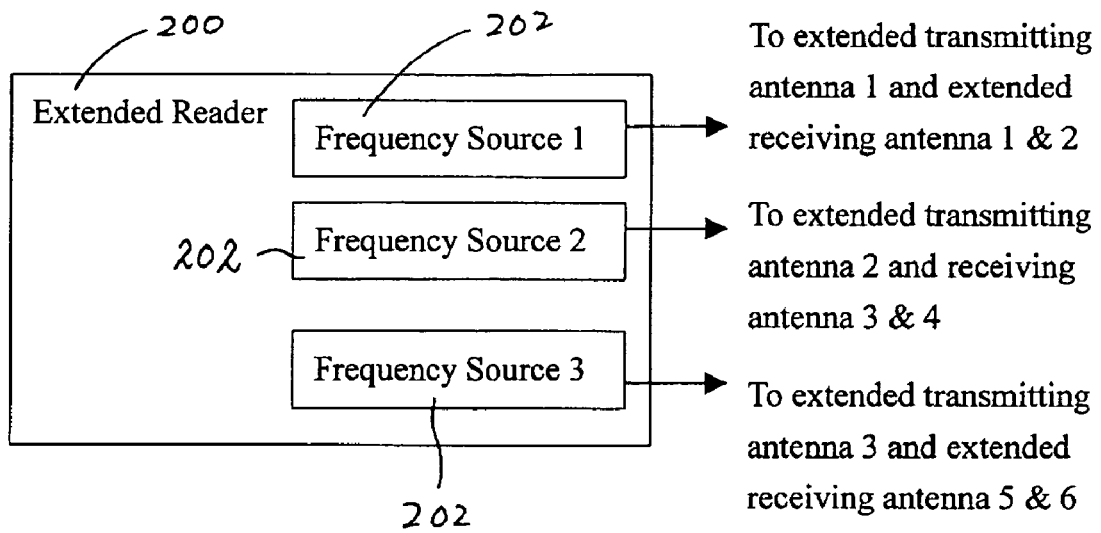
FIGS. 23F and 23G show a further extension of the arrangement of FIG. 23A, where the transmitting antennae are enabled to operate at different non-interfering frequency channels or hopping frequency sequences so that they can be turned on simultaneously, and the receiving antennae contain complete down-conversion circuit to enable them to be turned on simultaneously, and each of the receiving antennae with a complete down-conversion receiver circuit can work on one of the transmitting frequencies or hopping frequency sequences of the transmitting antennae.
Figure 23G:
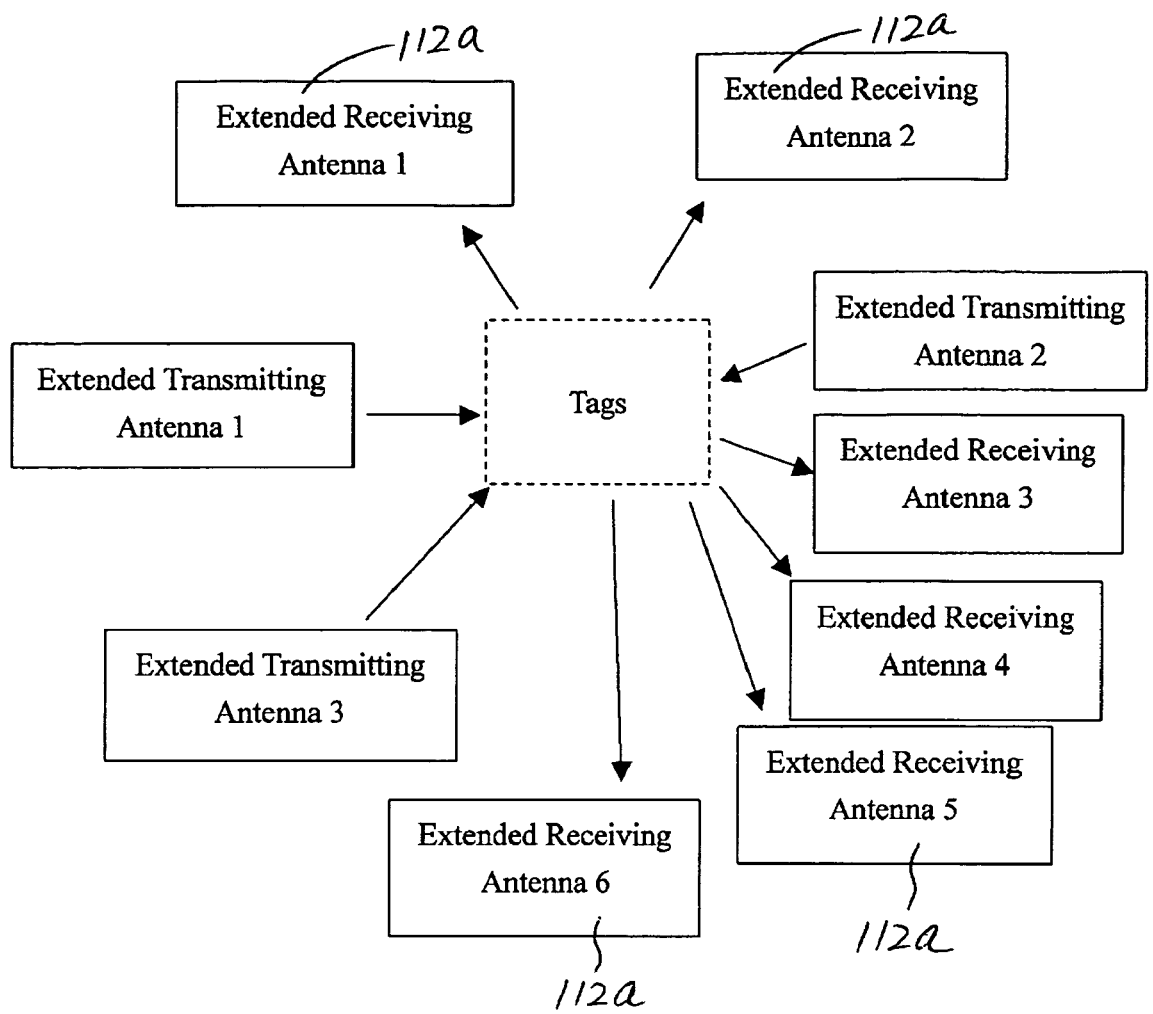

The system also entails a further extension of the configuration shown in FIG. 23A, i.e. multiple-transmit multiple-receive, in which the active transmitting antennae operate at different frequency channels (non-interfering channels) or hopping frequency sequences, from an extended reader 200 with multiple frequency sources 202, so that simultaneous transmission can be achieved, and in which the active receiving antennae 112a contain complete down-conversion block so that simultaneous reception can be achieved, as shown in FIGS. 23F and 23G This is in effect a full combination of the arrangements in FIGS. 23B to 23E. Each of the receiving antennae with a complete down-conversion receiver circuit works on one of the transmitting frequency or hopping frequency sequence of the transmitting antennae.

Figure 24:
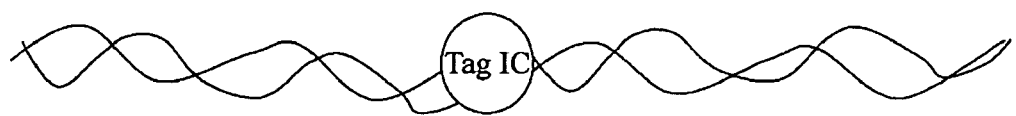
FIG. 24 shows a first novel RFID tag arrangement according to the present invention.

A novel RFID tag arrangement is shown in FIG. 24, in which an RFID tag 120 is embedded in wide temperature range plastic with metallic yarn 122 woven out in various lengths for direct sewing onto cloth. The tag 120 is sewn onto the original cloth and follows the production line all the way. The tag 120 thus allows a piece of clothing to be tracked during the production process. The metallic yarn 122 is thin enough to be sewn onto a piece of cloth without being noticed or become obtrusive later in the finished clothing.

Figure 25:
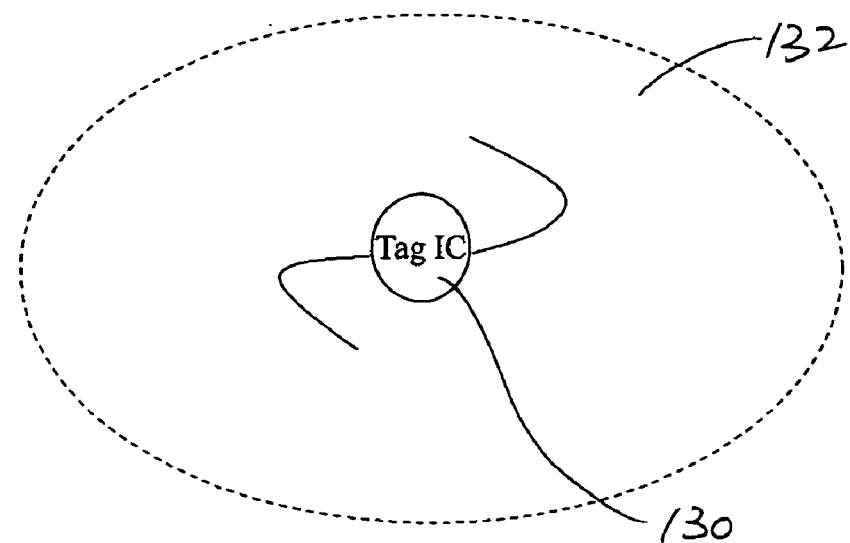
FIG. 25 shows a second novel RFID tag arrangement in a button, according to the present invention.

A further novel RFID tag arrangement is shown in FIG. 25 in which an RFID tag 130 is embedded in wide temperature range plastic and spiral dipole antenna and further insertion molded into a button 132. Such an RFID tag allows any clothing, once sewn with such a tag, to be tracked and traced along the logistics path. The advantage of such an arrangement is that it is aesthetically non-obtrusive, and the normal distance and spacing between buttons incorporating RFID tags will enable better performance even in densely packed environment.

Figure 26:
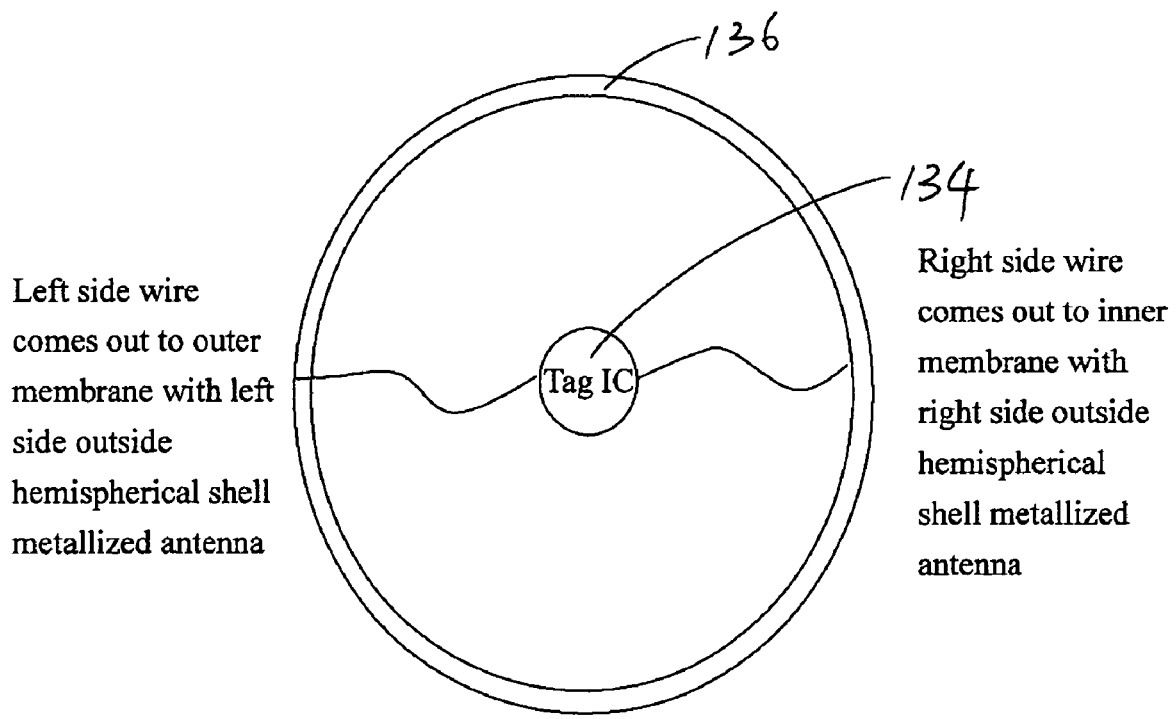
FIG. 26 shows a third novel RFID tag arrangement according to the present invention.

An additional novel tag arrangement is shown in FIG. 26, in which an RFID tag is embedded in wide temperature range high impact strength plastic with metal wires strung out to surface of inner core, on which two layers of metallized film, each forming a half hemispherical shell, facing opposite direction, are formed. Such allows the RFID tag 134 to be embedded in, e.g. a golf ball 136, which enables the position of the golf ball to be tracked in various environment, e.g. in a golf course, driving range, or in home. The ownership of the golf ball incorporating such an RFID tag may be identified. Once hit and reaching the target zone, the where-about of the golf ball and its proximity to the flag may also be determined.

Figure 27C:
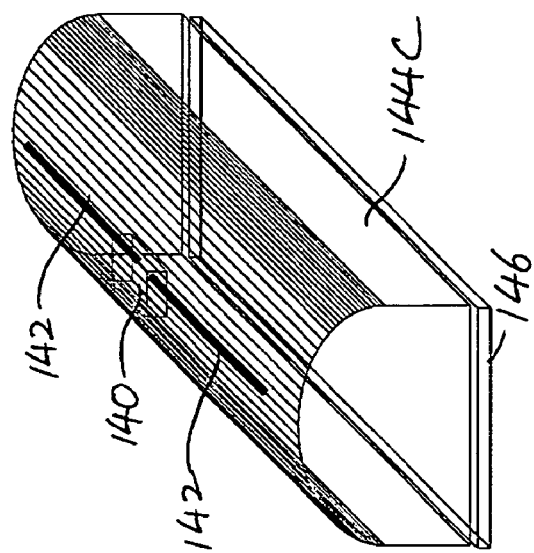
FIGS. 27A to 27C show novel RFID tag arrangements in which the RFID tag is placed on top of dielectric lens of various shapes.
Figure 27B:
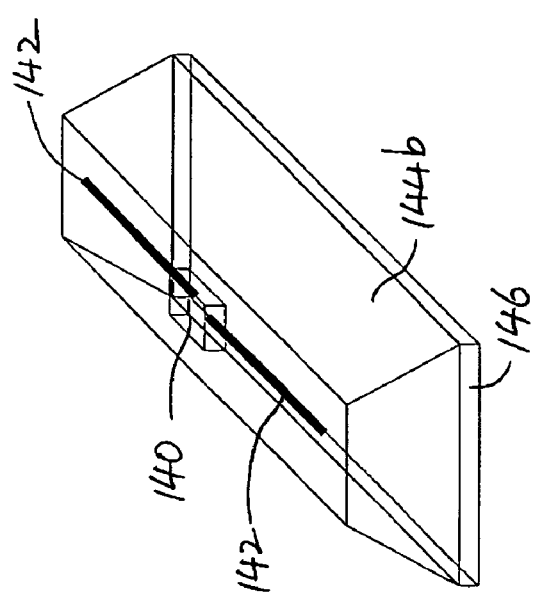
Figure 27A:
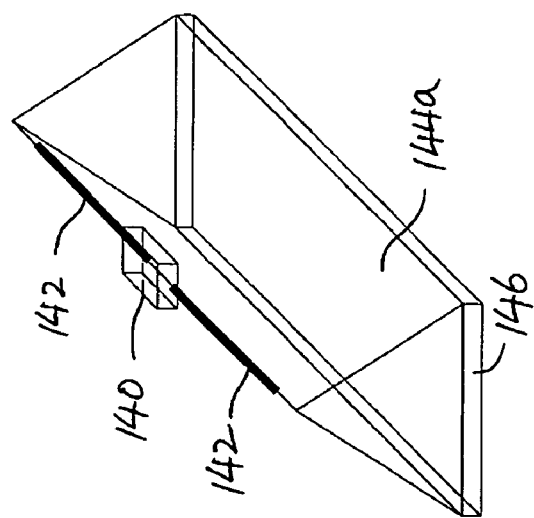

Further novel tag arrangements are shown in FIGS. 27A to 27C, in which an RFID tag 140 with two antennae 142 are placed on top of various shapes of dielectric lens 144a, 144b, 144c, with convergent characteristics, centre cut and backed with metal ground plane 146. The dielectric lens may be 2-dimensional or 3-dimensional convex lens, triangular shaped convex lens, or 3-dimensional diamond shaped structure. Various characteristics materials may be used for forming the cap versus the body. The cap may follow same contour or may fill up the gap to make the tag fully rectangular. Such arrangements allow tag operation when backed by a large structure of metal. The distance between the metal back 146 and the top (where the tag antenna is situated) is fixed and hence the tag antennae 142 will not be too close to the metal structure behind. The convergent lens design will force the energy impinging on the RFID tag to be refracted towards the centre, thus later being reflected from the metal back 146 and returning directly toward the antennae 142. This will ensure a larger collection of energy otherwise not intercepted by the tag antennae 142.

Dielectric materials suitable for use in such arrangements include acrylic, acrylonitrile-butadiene-styrene (ABS), polystyrene (PS), etc., that are typically termed plastic. The various "characteristics" are the dielectric constant and the loss tangent of the dielectric material. The use of dielectric materials, with its dielectric constant, will effectively reduce the size requirement of the tag, typically by a factor of the square root of the dielectric constant multiplied by an air-dielectric compensation factor.

Figure 28:
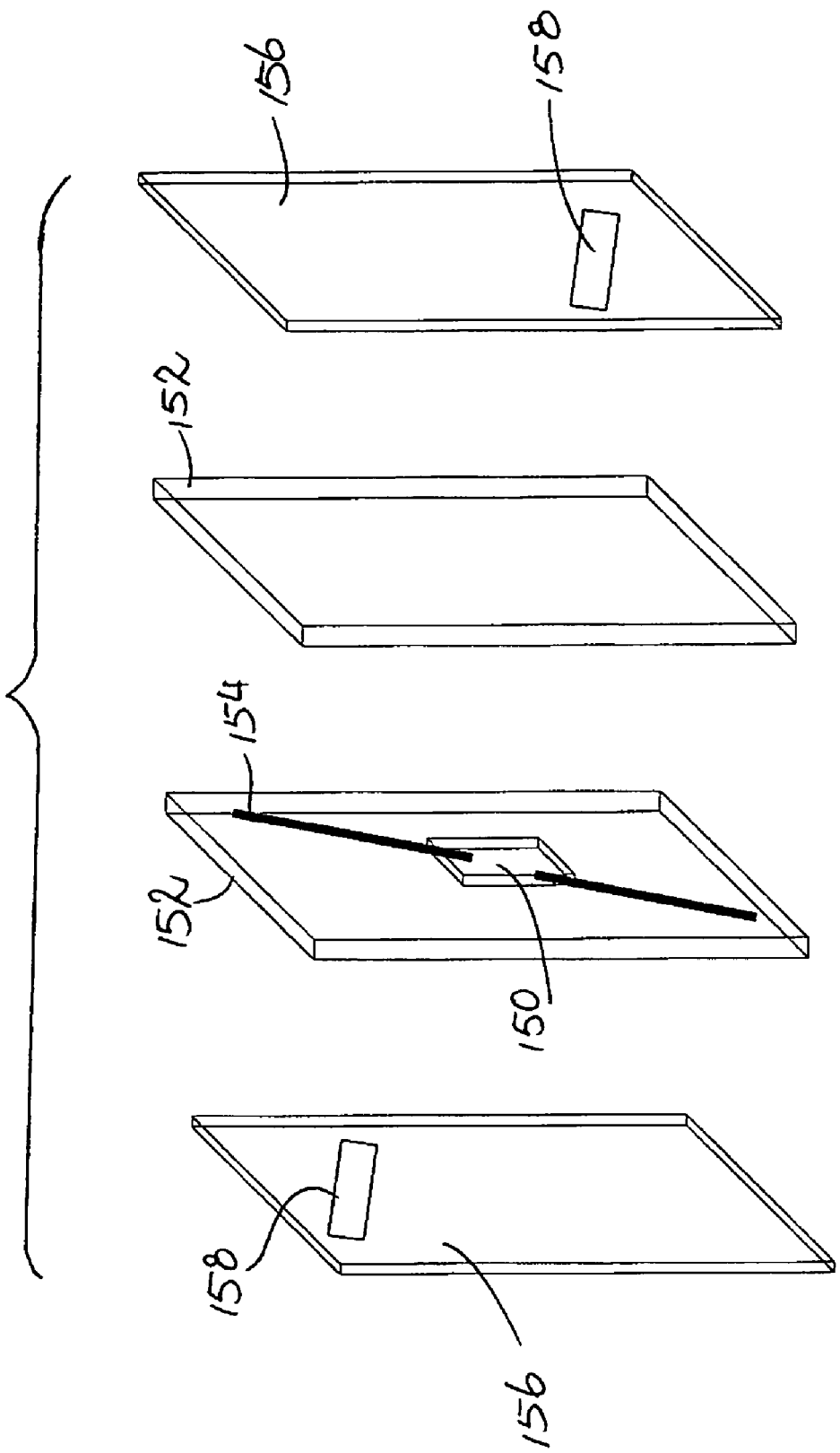
FIG. 28 shows an exploded view of a further novel RFID tag arrangement according to the present invention.

A further novel RFID tag arrangement is shown in FIG. 28, in which an RFID tag 150 is pressed between two slices of dielectric materials 152. A tag antenna 154, being a dipole antenna, is formed inside of the two slices of dielectric materials 152, from corner to corner. Metal plates 156 of different size and shape are provided on the outside. The metal plates 156 contain slots 158 at appropriate point over and perpendicular to the dipole antenna 154 inside, to couple out energy.

It should be understood that the above only illustrates and describes examples whereby the present invention may be carried out, and that modifications and/or alterations may be made thereto without departing from the spirit of the invention.

It should also be understood that certain features of the invention, which are, for clarity, described in the context of separate embodiments, may also be provided in combination in a single embodiment. Conversely, various features of the invention which are, for brevity, described in the context of a single embodiment, may also be provided or separately or in any suitable subcombination.

What is claimed is:

1. An RFID reader adapted to receive data from at least one RFID tag, and adapted to receive and/or transmit video/image and/or audio data, including means for accessing data of at least one pre-recorded video/image file, means for receiving video/image data from a digital camera, and means for comparing said data of said at least one pre-recorded video/image file with said video/image data received from said digital camera.

2. An RFID reader according to claim 1 wherein said comparing means compares said data of said at least one pre-recorded video/image file with said video/image data received from said digital camera by using an image comparison algorithm.

3. An RFID reader according to claim 1 wherein said RFID reader is adapted to receive audio signals from a microphone.

4. An RFID reader according to claim 1 wherein said RFID reader is adapted to transmit audio signals via a speaker.

5. An RFID reader according to claim 1 including means for compressing said video/image data received from said digital camera.

6. An RFID reader according to claim 1 wherein said at least one video/image file is stored in a server or local database accessible by said RFID reader.

7. An RFID system including an RFID reader according to claim 1, and at least a server containing data of at least one pre-recorded video/image and/or audio file accessible by said RFID reader.

8. An RFID system according to claim 7 further including at least a digital camera adapted to transmit video/image signals to said RFID reader.

9. An RFID system according to claim 7 further including at least a speaker adapted to output audio signals from said RFID reader.

10. An RFID system according to claim 7 further including at least a microphone adapted to transmit audio signals to said RFID reader.

11. An RFID system according to claim 7 wherein said RFID reader is connected with the rest of the system both wirelessly and with at least one wire.

12. An RFID system according to claim 7 wherein said RFID reader is adapted to be connected with a plurality of access points.

13. An RFID system according to claim 7 wherein said RFID reader is adapted to be connected with a plurality of routers.

14. An RFID system according to claim 7 wherein said RFID reader is adapted to be connected with a plurality of servers.

15. A method of operating an RFID system including at least an RFID reader adapted to receive data from at least one RFID tag, and adapted to receive and/or transmit video/image and/or audio data, including steps:
    (a) detecting data of at least one RFID tag;
    (b) capturing video/image and/or audio data of an object carrying said at least one RFID tag;
    (c) sending said data of said at least one RFID tag to a database;
    (d) obtaining from said database pres-stored video/image and/or audio data of said object associated with said at least one RFID tag; and
    (e) comparing video/image and/or audio data of said object captured in said step (b) with said data obtained from said database in said step (d).

16. A method according to claim 15 wherein said step (b) is carried out by at least a digital camera.

17. A method according to claim 15 wherein said step (b) is carried out by a microphone.

18. A method according to claim 15 wherein said step (e) is carried out by using an image processing algorithm.

19. A method according to claim 15 further including a step (f) of outputting said audio data obtained from said database in step (d).

20. A method according to claim 19 wherein said audio data are outputted by at least one speaker.

21. A method according to claim 15 including a step (f) of transmitting said video/image and/or audio data of said object captured in said step (b) to a personal monitor.

* * * * *